(12) United States Patent
Missig et al.

(10) Patent No.: US 8,799,826 B2
(45) Date of Patent: Aug. 5, 2014

(54) DEVICE, METHOD, AND GRAPHICAL USER INTERFACE FOR MOVING A CALENDAR ENTRY IN A CALENDAR APPLICATION

(75) Inventors: Julian Missig, Redwood City, CA (US); Jonathan Koch, San Francisco, CA (US); Avi E. Cieplinski, San Francisco, CA (US); B. Michael Victor, Menlo Park, CA (US); Jeffrey Traer Bernstein, San Francisco, CA (US); Duncan R. Kerr, San Francisco, CA (US); Myra M. Haggerty, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 820 days.

(21) Appl. No.: 12/567,171

(22) Filed: Sep. 25, 2009

(65) Prior Publication Data

US 2011/0078622 A1    Mar. 31, 2011

(51) Int. Cl.
*G06F 3/033* (2013.01)
*G06F 3/048* (2013.01)

(52) U.S. Cl.
USPC .......................................... 715/863; 715/801

(58) Field of Classification Search
USPC ......... 715/784, 788, 798, 799–801, 863, 769, 715/770
See application file for complete search history.

(56) References Cited

U.S. PATENT DOCUMENTS

| | | |
|---|---|---|
| 4,885,786 A | 12/1989 | Anderson et al. |
| 5,283,561 A | 2/1994 | Lumelsky et al. |
| 5,327,161 A | 7/1994 | Logan et al. |
| 5,359,703 A | 10/1994 | Robertson et al. |
| 5,371,845 A | 12/1994 | Newell et al. |
| 5,463,725 A | 10/1995 | Henckel et al. |
| 5,483,261 A | 1/1996 | Yasutake |
| 5,490,241 A | 2/1996 | Mallgren et al. |
| 5,511,148 A | 4/1996 | Wellner |

(Continued)

FOREIGN PATENT DOCUMENTS

| | | |
|---|---|---|
| EP | 1 577 746 A2 | 9/2005 |
| EP | 1 840 717 A1 | 10/2007 |

(Continued)

OTHER PUBLICATIONS

Angell, "Is Bimanual the Future Paradigm for Human Computer Interaction?" University of Plymouth, 2006, 36 pages.

(Continued)

*Primary Examiner* — Haoshian Shih
(74) *Attorney, Agent, or Firm* — Morrison & Foerster LLP

(57) ABSTRACT

In some embodiments, a multifunction device with a display and a touch-sensitive surface displays a multi-week view in a calendar application on the display and detects a first input by a user. In response to detecting the first input by the user, the device selects a first calendar entry in the multi-week view in the calendar application. While continuing to detect selection of the first calendar entry by the user, the device detects a first multifinger gesture on the touch-sensitive surface, and in response to detecting the first multifinger gesture on the touch-sensitive surface, the device expands display of a single week in the multi-week view; and maintains display of the first calendar entry on the display. In some embodiments, the device moves the first calendar entry to a date and time in the calendar application in accordance with a second input by the user.

28 Claims, 29 Drawing Sheets

(56) References Cited

U.S. PATENT DOCUMENTS

| | | |
|---|---|---|
| 5,533,183 A | 7/1996 | Henderson, Jr. et al. |
| 5,581,670 A | 12/1996 | Bier et al. |
| 5,675,753 A | 10/1997 | Hansen et al. |
| 5,729,673 A | 3/1998 | Cooper et al. |
| 5,808,601 A | 9/1998 | Leah et al. |
| 5,825,352 A | 10/1998 | Bisset et al. |
| 5,872,559 A | 2/1999 | Shieh |
| 5,880,743 A | 3/1999 | Moran et al. |
| 5,886,697 A | 3/1999 | Naughton et al. |
| 5,910,800 A | 6/1999 | Shields et al. |
| 6,025,844 A | 2/2000 | Parsons |
| 6,065,021 A | 5/2000 | George |
| 6,073,036 A | 6/2000 | Heikkinen et al. |
| 6,075,531 A | 6/2000 | DeStefano |
| 6,160,551 A | 12/2000 | Naughton et al. |
| 6,175,364 B1 | 1/2001 | Wong et al. |
| 6,208,329 B1 | 3/2001 | Ballare |
| 6,215,490 B1 | 4/2001 | Kaply |
| 6,232,957 B1 | 5/2001 | Hinckley |
| 6,253,218 B1 | 6/2001 | Aoki et al. |
| 6,278,443 B1 | 8/2001 | Amro et al. |
| 6,323,846 B1 | 11/2001 | Westerman et al. |
| 6,346,935 B1 | 2/2002 | Nakajima et al. |
| 6,392,673 B1 | 5/2002 | Andrew et al. |
| 6,480,813 B1 | 11/2002 | Bloomquist et al. |
| 6,565,608 B1 | 5/2003 | Fein et al. |
| 6,570,557 B1 | 5/2003 | Westerman et al. |
| 6,646,655 B1 | 11/2003 | Brandt et al. |
| 6,657,615 B2 | 12/2003 | Harada |
| 6,677,932 B1 | 1/2004 | Westerman |
| 6,686,935 B1 | 2/2004 | Richard |
| 6,690,365 B2 | 2/2004 | Hinckley et al. |
| 6,807,361 B1 | 10/2004 | Girgensohn et al. |
| 6,888,536 B2 | 5/2005 | Westerman et al. |
| 6,903,751 B2 | 6/2005 | Saund et al. |
| 6,928,619 B2 | 8/2005 | Clow et al. |
| 7,030,861 B1 | 4/2006 | Westerman et al. |
| 7,093,192 B2 | 8/2006 | Mullen et al. |
| 7,110,005 B2 | 9/2006 | Arvin et al. |
| 7,134,093 B2 | 11/2006 | Etgen et al. |
| 7,158,158 B1 | 1/2007 | Fleming et al. |
| 7,190,379 B2 | 3/2007 | Nissen |
| 7,216,293 B2 | 5/2007 | Kataoka et al. |
| 7,218,226 B2 | 5/2007 | Wehrenberg |
| 7,287,241 B2 | 10/2007 | Balsiger |
| 7,454,717 B2 | 11/2008 | Hinckley et al. |
| 7,456,823 B2 | 11/2008 | Poupyrev et al. |
| 7,469,381 B2 | 12/2008 | Ording |
| 7,469,833 B1 | 12/2008 | Kelley et al. |
| 7,477,233 B2 | 1/2009 | Duncan et al. |
| 7,489,324 B2 | 2/2009 | Royal et al. |
| 7,555,710 B2 | 6/2009 | Kobashi et al. |
| 7,557,797 B2 | 7/2009 | Ludwig |
| 7,614,008 B2 | 11/2009 | Ording |
| 7,619,618 B2 | 11/2009 | Westerman et al. |
| 7,633,076 B2 | 12/2009 | Huppi et al. |
| 7,634,725 B2 | 12/2009 | Nishikawa |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,688,306 B2 | 3/2010 | Wehrenberg et al. |
| 7,694,231 B2 | 4/2010 | Kocienda et al. |
| 7,705,830 B2 | 4/2010 | Westerman et al. |
| 7,728,823 B2 | 6/2010 | Lyon et al. |
| 7,743,348 B2 | 6/2010 | Robbins et al. |
| 7,812,826 B2 | 10/2010 | Ording et al. |
| 7,856,605 B2 | 12/2010 | Ording et al. |
| 7,904,810 B2 | 3/2011 | Chen et al. |
| 7,934,156 B2 | 4/2011 | Forstall et al. |
| 7,936,341 B2 | 5/2011 | Weiss |
| 7,956,847 B2 | 6/2011 | Christie |
| 8,023,158 B2 | 9/2011 | Maki et al. |
| 8,024,667 B2 | 9/2011 | Shaw et al. |
| 8,095,884 B2 | 1/2012 | Karunakaran et al. |
| 8,161,400 B2 | 4/2012 | Kwon |
| 8,171,401 B2 | 5/2012 | Sun |
| 8,171,431 B2 | 5/2012 | Grossman et al. |
| 8,176,435 B1 | 5/2012 | Jitkoff et al. |
| 8,176,438 B2 | 5/2012 | Zaman et al. |
| 8,209,630 B2 | 6/2012 | Thimbleby et al. |
| 8,276,085 B2 | 9/2012 | Sherwani |
| 8,291,349 B1 | 10/2012 | Park et al. |
| 8,291,350 B1 | 10/2012 | Park et al. |
| 8,312,387 B2 | 11/2012 | Williams et al. |
| 8,448,083 B1 | 5/2013 | Migos et al. |
| 2002/0015024 A1 | 2/2002 | Westerman et al. |
| 2002/0018075 A1 | 2/2002 | Maulik et al. |
| 2002/0057292 A1 | 5/2002 | Holtz |
| 2002/0062321 A1 | 5/2002 | Shibata |
| 2002/0109668 A1 | 8/2002 | Rosenberg et al. |
| 2002/0109708 A1 | 8/2002 | Peurach et al. |
| 2002/0161772 A1 | 10/2002 | Bergelson et al. |
| 2003/0014382 A1 | 1/2003 | Iwamoto et al. |
| 2003/0128192 A1 | 7/2003 | van Os |
| 2003/0142137 A1 | 7/2003 | Brown et al. |
| 2003/0210268 A1 | 11/2003 | Kataoka et al. |
| 2004/0066407 A1 | 4/2004 | Regan et al. |
| 2004/0088656 A1 | 5/2004 | Washio |
| 2004/0141009 A1 | 7/2004 | Hinckley et al. |
| 2004/0150668 A1 | 8/2004 | Myers et al. |
| 2004/0174399 A1 | 9/2004 | Wu et al. |
| 2004/0225968 A1 | 11/2004 | Look et al. |
| 2004/0239691 A1 | 12/2004 | Sprang et al. |
| 2005/0052427 A1 | 3/2005 | Wu et al. |
| 2005/0068290 A1 | 3/2005 | Jaeger |
| 2005/0071774 A1 | 3/2005 | Lipsky et al. |
| 2005/0088418 A1 | 4/2005 | Nguyen |
| 2005/0088423 A1 | 4/2005 | Keely et al. |
| 2005/0091008 A1 | 4/2005 | Green et al. |
| 2005/0108620 A1 | 5/2005 | Allyn et al. |
| 2005/0108656 A1 | 5/2005 | Wu et al. |
| 2005/0231512 A1 | 10/2005 | Niles et al. |
| 2005/0289476 A1 | 12/2005 | Tokkonen |
| 2006/0001650 A1 | 1/2006 | Robbins et al. |
| 2006/0022955 A1 | 2/2006 | Kennedy |
| 2006/0026521 A1 | 2/2006 | Hotelling et al. |
| 2006/0033724 A1 | 2/2006 | Chaudhri et al. |
| 2006/0055662 A1 | 3/2006 | Rimas-Ribikauskas et al. |
| 2006/0055684 A1 | 3/2006 | Rimas-Ribikauskas et al. |
| 2006/0085757 A1 | 4/2006 | Andre et al. |
| 2006/0085767 A1 | 4/2006 | Hinckley et al. |
| 2006/0112335 A1 | 5/2006 | Hofmeister et al. |
| 2006/0125803 A1 | 6/2006 | Westerman et al. |
| 2006/0129945 A1 | 6/2006 | Dettinger et al. |
| 2006/0136246 A1 | 6/2006 | Tu |
| 2006/0136833 A1 | 6/2006 | Dettinger et al. |
| 2006/0161870 A1 | 7/2006 | Hotelling et al. |
| 2006/0174568 A1 | 8/2006 | Kinoshita et al. |
| 2006/0184966 A1 | 8/2006 | Hunleth et al. |
| 2006/0190833 A1 | 8/2006 | SanGiovanni et al. |
| 2006/0197750 A1 | 9/2006 | Kerr et al. |
| 2006/0197753 A1 | 9/2006 | Hotelling |
| 2006/0238517 A1 | 10/2006 | King et al. |
| 2006/0238521 A1 | 10/2006 | Westerman et al. |
| 2006/0248469 A1 | 11/2006 | Czerwinski et al. |
| 2006/0279532 A1 | 12/2006 | Olszewski et al. |
| 2007/0050726 A1 | 3/2007 | Wakai et al. |
| 2007/0067711 A1 | 3/2007 | Woodall et al. |
| 2007/0079236 A1 | 4/2007 | Schrier et al. |
| 2007/0113198 A1 | 5/2007 | Robertson et al. |
| 2007/0126732 A1 | 6/2007 | Robertson et al. |
| 2007/0152980 A1 | 7/2007 | Kocienda et al. |
| 2007/0152984 A1 | 7/2007 | Ording et al. |
| 2007/0160345 A1 | 7/2007 | Sakai et al. |
| 2007/0177803 A1 | 8/2007 | Elias et al. |
| 2007/0186178 A1 | 8/2007 | Schiller |
| 2007/0192744 A1 | 8/2007 | Reponen |
| 2007/0192749 A1 | 8/2007 | Baudisch |
| 2007/0198942 A1 | 8/2007 | Morris |
| 2007/0220444 A1 | 9/2007 | Sunday et al. |
| 2007/0229471 A1 | 10/2007 | Kim et al. |
| 2007/0236475 A1 | 10/2007 | Wherry |
| 2007/0245257 A1 | 10/2007 | Chan et al. |
| 2007/0247435 A1 | 10/2007 | Benko et al. |

(56) References Cited

U.S. PATENT DOCUMENTS

| | | |
|---|---|---|
| 2007/0253025 A1 | 11/2007 | Terayoko |
| 2007/0257890 A1 | 11/2007 | Hotelling |
| 2008/0022197 A1 | 1/2008 | Bargeron et al. |
| 2008/0034317 A1 | 2/2008 | Fard et al. |
| 2008/0036743 A1 | 2/2008 | Westerman et al. |
| 2008/0042978 A1 | 2/2008 | Perez-Noguera |
| 2008/0052945 A1 | 3/2008 | Matas et al. |
| 2008/0066016 A1 | 3/2008 | Dowdy et al. |
| 2008/0072173 A1 | 3/2008 | Brunner et al. |
| 2008/0094368 A1 | 4/2008 | Ording et al. |
| 2008/0098331 A1 | 4/2008 | Novick et al. |
| 2008/0100642 A1 | 5/2008 | Betancourt et al. |
| 2008/0109751 A1 | 5/2008 | Fitzmaurice et al. |
| 2008/0140868 A1 | 6/2008 | Kalayjian et al. |
| 2008/0147664 A1 | 6/2008 | Fujiwara et al. |
| 2008/0148181 A1* | 6/2008 | Reyes et al. ............... 715/801 |
| 2008/0150715 A1 | 6/2008 | Tang et al. |
| 2008/0165141 A1 | 7/2008 | Christie |
| 2008/0165142 A1 | 7/2008 | Kocienda et al. |
| 2008/0167834 A1 | 7/2008 | Herz et al. |
| 2008/0180404 A1 | 7/2008 | Han et al. |
| 2008/0180405 A1 | 7/2008 | Han et al. |
| 2008/0180406 A1 | 7/2008 | Han et al. |
| 2008/0186285 A1 | 8/2008 | Shimizu |
| 2008/0211766 A1 | 9/2008 | Westerman et al. |
| 2008/0229223 A1 | 9/2008 | Kake |
| 2008/0244410 A1 | 10/2008 | Schormann |
| 2008/0259040 A1 | 10/2008 | Ording et al. |
| 2008/0267468 A1 | 10/2008 | Geiger et al. |
| 2008/0270886 A1* | 10/2008 | Gossweiler et al. ......... 715/227 |
| 2008/0278455 A1 | 11/2008 | Atkins et al. |
| 2008/0284799 A1 | 11/2008 | Hollemans et al. |
| 2008/0297482 A1 | 12/2008 | Weiss |
| 2008/0303786 A1 | 12/2008 | Nakamura et al. |
| 2008/0309632 A1 | 12/2008 | Westerman et al. |
| 2008/0320391 A1 | 12/2008 | Lemay et al. |
| 2008/0320419 A1 | 12/2008 | Matas et al. |
| 2009/0013350 A1 | 1/2009 | Ohlfs et al. |
| 2009/0051660 A1 | 2/2009 | Feland, III et al. |
| 2009/0051946 A1 | 2/2009 | Hibi |
| 2009/0079700 A1 | 3/2009 | Abernathy |
| 2009/0113330 A1 | 4/2009 | Garrison et al. |
| 2009/0122018 A1 | 5/2009 | Vymenets et al. |
| 2009/0150775 A1 | 6/2009 | Miyazaki et al. |
| 2009/0158326 A1 | 6/2009 | Hunt et al. |
| 2009/0164936 A1 | 6/2009 | Kawaguchi |
| 2009/0172606 A1* | 7/2009 | Dunn et al. ............... 715/863 |
| 2009/0174679 A1 | 7/2009 | Westerman |
| 2009/0178008 A1 | 7/2009 | Herz et al. |
| 2009/0183930 A1 | 7/2009 | Yang et al. |
| 2009/0184939 A1 | 7/2009 | Wohlstadter et al. |
| 2009/0228792 A1 | 9/2009 | van Os et al. |
| 2009/0231275 A1 | 9/2009 | Odgers |
| 2009/0237363 A1 | 9/2009 | Levy et al. |
| 2009/0239587 A1 | 9/2009 | Negron et al. |
| 2009/0256809 A1 | 10/2009 | Minor |
| 2009/0256857 A1 | 10/2009 | Davidson et al. |
| 2009/0259964 A1 | 10/2009 | Davidson et al. |
| 2009/0282332 A1 | 11/2009 | Porat |
| 2009/0303231 A1 | 12/2009 | Robinet et al. |
| 2009/0307589 A1 | 12/2009 | Inose et al. |
| 2009/0309881 A1 | 12/2009 | Zhao et al. |
| 2009/0327975 A1 | 12/2009 | Stedman |
| 2010/0002002 A1 | 1/2010 | Lipsky et al. |
| 2010/0007623 A1 | 1/2010 | Kaneko et al. |
| 2010/0017734 A1 | 1/2010 | Cummins et al. |
| 2010/0031203 A1 | 2/2010 | Morris et al. |
| 2010/0053111 A1 | 3/2010 | Karlsson |
| 2010/0058238 A1 | 3/2010 | Ben Moshe |
| 2010/0088624 A1 | 4/2010 | Bligh et al. |
| 2010/0088641 A1 | 4/2010 | Choi |
| 2010/0090971 A1 | 4/2010 | Choi et al. |
| 2010/0095205 A1 | 4/2010 | Kinoshita |
| 2010/0095206 A1 | 4/2010 | Kim |
| 2010/0107101 A1 | 4/2010 | Shaw et al. |
| 2010/0134425 A1 | 6/2010 | Storrusten |
| 2010/0146436 A1 | 6/2010 | Jakobson et al. |
| 2010/0156813 A1 | 6/2010 | Duarte et al. |
| 2010/0162105 A1* | 6/2010 | Beebe et al. ............... 715/273 |
| 2010/0185949 A1 | 7/2010 | Jaeger |
| 2010/0194703 A1 | 8/2010 | Fedor et al. |
| 2010/0214571 A1 | 8/2010 | Luo |
| 2010/0218100 A1 | 8/2010 | Simon et al. |
| 2010/0228746 A1 | 9/2010 | Harada |
| 2010/0231533 A1 | 9/2010 | Chaudhri |
| 2010/0235794 A1 | 9/2010 | Ording |
| 2010/0283743 A1 | 11/2010 | Coddington |
| 2010/0283750 A1 | 11/2010 | Kang et al. |
| 2010/0289760 A1 | 11/2010 | Jonoshita et al. |
| 2010/0299598 A1 | 11/2010 | Shin et al. |
| 2010/0302176 A1 | 12/2010 | Nikula et al. |
| 2010/0313125 A1 | 12/2010 | Fleizach et al. |
| 2010/0313126 A1 | 12/2010 | Jung et al. |
| 2010/0318904 A1 | 12/2010 | Hillis et al. |
| 2010/0325529 A1 | 12/2010 | Sun |
| 2010/0333044 A1 | 12/2010 | Kethireddy |
| 2011/0004830 A1 | 1/2011 | Von Kaenel et al. |
| 2011/0010672 A1 | 1/2011 | Hope |
| 2011/0012856 A1 | 1/2011 | Maxwell et al. |
| 2011/0029927 A1 | 2/2011 | Lietzke et al. |
| 2011/0029934 A1 | 2/2011 | Locker et al. |
| 2011/0069017 A1 | 3/2011 | Victor |
| 2011/0069018 A1 | 3/2011 | Atkins et al. |
| 2011/0074710 A1 | 3/2011 | Weeldreyer et al. |
| 2011/0093812 A1 | 4/2011 | Fong |
| 2011/0109581 A1 | 5/2011 | Ozawa et al. |
| 2011/0128367 A1 | 6/2011 | Yoshioka et al. |
| 2011/0145759 A1 | 6/2011 | Leffert et al. |
| 2011/0163944 A1 | 7/2011 | Bilbrey et al. |
| 2011/0163968 A1 | 7/2011 | Hogan |
| 2011/0179368 A1 | 7/2011 | King et al. |
| 2011/0179373 A1 | 7/2011 | Moore et al. |
| 2011/0185316 A1 | 7/2011 | Reid et al. |
| 2011/0185321 A1 | 7/2011 | Capela et al. |
| 2011/0209102 A1 | 8/2011 | Hinckley et al. |
| 2011/0209104 A1 | 8/2011 | Hinckley et al. |
| 2011/0231796 A1 | 9/2011 | Vigil |
| 2011/0252370 A1 | 10/2011 | Chaudhri |
| 2011/0252380 A1 | 10/2011 | Chaudhri |
| 2011/0252381 A1 | 10/2011 | Chaudhri |
| 2011/0258537 A1 | 10/2011 | Rives et al. |
| 2011/0302519 A1 | 12/2011 | Fleizach et al. |
| 2012/0023453 A1 | 1/2012 | Wagner |
| 2012/0023459 A1 | 1/2012 | Westerman |
| 2012/0030569 A1 | 2/2012 | Migos et al. |
| 2012/0044150 A1 | 2/2012 | Karpin et al. |
| 2013/0174062 A1 | 7/2013 | Stoustrup |
| 2013/0215064 A1 | 8/2013 | Cholewin et al. |

FOREIGN PATENT DOCUMENTS

| | | |
|---|---|---|
| EP | 2 060 970 A1 | 5/2009 |
| EP | 2 068 237 A2 | 6/2009 |
| EP | 2 284 675 A2 | 2/2011 |
| WO | WO 00/16186 A2 | 3/2000 |
| WO | WO 2006/020305 A2 | 2/2006 |
| WO | WO 2007/098243 A2 | 8/2007 |
| WO | WO 2008/138046 A1 | 11/2008 |

OTHER PUBLICATIONS

Apted et al., "Tabletop Sharing of Digital Photographs for the Elderly," CHI 2006 Proceedings, Apr. 2006, Montreal, Quebec, Canada, 10 pages.

Beaudouin-Lafon et al., "CPN/Tools: A Post-WIMP Interface for Editing and Simulating Coloured Petri Nets," Proceeding of 22nd International Conference on Applications and Theory of Petri Nets 2001, 10 pages.

Bederson, B., "PhotoMesa: A Zoomable Image Browser Using Quantum Treemaps and Bubblemaps," UIST 2001, Orlando, Florida, Nov. 2001, 10 pages.

Benko et al., "Precise Selection Techniques for Multi-Touch Screens," CHI 2006, Apr. 22-27, 2006, 10 pages.

(56) References Cited

OTHER PUBLICATIONS

Brandl, et al., "Combining and Measuring the Benefits of Bimanual Pen and Direct-Touch Interaction on Horizontal Interfaces," AVI '08, May 2008, Naples, Italy, 8 pages.
Brandl, P. "Combining and Measuring the Benefits of Bimanual Pen and Direct-Touch Interaction on Horizontal Interfaces," Media Interaction Lab, May 2008, slide presentation, 26 pages.
Butz et al., "Hybrid Widgets on an Interactive Tabletop," Ubicomp '07, Sep. 2007, Innsbruck, Austria, 7 pages.
Buxton, W. et al., "A Study in Two Handed Input," Proceedings of CHI '86, Apr. 1986, Boston, MA, 10 pages.
Buxton, W. et al., "Issues and Techniques in Touch-Sensitive Tablet Input," Computer Graphics 19(3), http://www.dgp.toronto.edu/OTP/Papers/bill.buxton/touch.html, Proceedings of SIGGRAPH'85, 15 pages.
Buxton, W. et al., "Multi-Touch Systems that I Have Known and Loved," Jan. 12, 2007, 14 pages, http://www.billbuxton.com/multitouchOverview.html.
Buxton, W., "Chapter 5: Case Study Study 1: Touch Tablets," Haptic Input, Jan. 4, 2009, 20 pages.
Buxton, W., "Chapter 11: Two Handed Input in Human-Computer Interaction," Aug. 22, 2008, 16 pages.
Chen et al., "Relative role of merging and two-handed operation on command selection speed," Int. J. Human-Computer Studies 66 (2008) 729-740 (12), Jun. 2008.
Cho et al., "Interaction for Tabletop Computing Environment: An Analysis and Implementation," Science and Technology (2005), ACM, pp. 11-18.
Couturier et al., "Pointing Fingers: Using Multiple Direct Interactions with Visual Objects to Perform Music," Proceedings of the 2003 Conference on New Interfaces for Musical Expression, May 2003, Montreal, Canada, 4 pages.
Derene, G., "Microsoft Surface: Behind-the-Scenes First Look," Popular Mechanics.com, Jul. 1, 2007, http://www.popularmechanics.com/technology/gadgets/news/4217348?page=3, 4 pages.
Guimbretière et al., "Benefits of Merging Command Selection and Direct Manipulation," ACM Transaction on Computer-Human Interaction, vol. 12, No. 3, Sep. 2005, 17 pages.
Guimbretière, F., "Curriculum Vitae," 2008, 5 pages.
Hinckley, K., "Haptic Issues for Virtual Manipulation," University of Virginia, Dissertation presented Dec. 1996, http://research.microsoft.com/en-us/um/people/kenh/all-published-papers/hinckley-thesis-haptic-issues-for-virtual-manipulation.pdf, 216 pages.
Hinckley et al., "Interaction and Modeling Techniques for Desktop Two-Handed Input," UIST '98, San Francisco, CA, Nov. 1998, 10 pages.
Hodges et al., "ThinSight: Versatile Multi-touch Sensing for Thin Form-factor Displays," UIST'07, Oct. 7-10, 2007, Newport, Rhode Island, USA, 10 pages.
Inkscape, "Inkscape tutorial: Basic," Inkscape.org, Apr. 20, 2005, http://web.archive.org/web/20051225021958/http://inkscape.org/doc/basic/tutorial-basic.html, 6 pages.
Jin et al., "GIA: design of a gesture-based interaction photo album," Pers Ubiquit Comput, Jul. 1, 2004, 7 pages.
Kristensson et al., "InfoTouch: An Explorative Multi-Touch Visualization Interface for Tagged Photo Collections," Proceedings NordiCHI 2008, Oct. 20-22, 2008, 4 pages.
Kurata et al., "Tangible Tabletop Interface for an Expert to Collaborate with Remote Field Workers," CollabTech2005, Jul. 16, 2005, slides, 27 pages.
Kurata et al., "Tangible Tabletop Interface for an Expert to Collaborate with Remote Field Workers," CollabTech2005, Jul. 16, 2005, 6 pages.
Kurtenback et al., The Design of a GUI Paradigm based on Tables, Two hands, and Transparency, Mar. 27, 1997, 8 pages.
Lee et al., "A Multi-Touch Three Dimensional Touch-Sensitive Tablet," CHI 85 Proceedings, Apr. 1985, pp. 21-25.
Malik, S. et al., "Visual Touchpad: A Two handed Gestural Input Devices," ICMI'04, Oct. 13-15, 2004, 8 pages.
markandtanya, "Imagining multi-touch in outlook," May 2008, 3 pages.
Markusson, D., "Interface Development of a Multi-Touch Photo Browser," Umea University, Master's Thesis presented Apr. 18, 2008, 76 pages.
Matsushita et al., "Dual Touch: A Two-Handed Interface for Pen-Based PDSs," UIST '00, Nov. 2000, San Diego, California, 2 pages.
Matsushita et al., "HoloWall: Designing a Finger, Hand, Body, and Object Sensitive Wall," UIST '97 Banff, Alberta, Canada, Oct. 1997, 2 pages.
Media Interaction Lab, "Bimanual Pen & Touch," Nov. 2008, http://mi-lab.org/projects/bimanual-pen-touch, 5 pages.
Moscovich et al., "Indirect Mappings of Multi-touch Input Using One and Two Hands,"CHI 2008, Apr. 2008, Florence, Italy, 9 pages.
Moscovich et al., "Multi-finger Cursor Techniques," GI '06 Proceedings of Graphics Interface 2006, Jun. 2006, Quebec City, Quebec, Canada, 7 pages.
Moscovich, T., "Multi-touch Interaction," CHI 2006, Montréal, Canada, Apr. 2006, 4 pages.
Moscovich, T., "Principles and Applications of Multi-touch Interaction," Brown University, Dissertation presented May 2007, 114 pages.
Raskin, A., "Enso 2.0 Design Thoughts," Aza's Thoughts, Dec. 6, 2008, http://www.azarask.in/blog/post/enso-20-design-thoughts/, 16 pages.
Raskin, A., "Visual Feedback : Why Modes Kill," Humanized, Dec. 2006, 18 pages.
Sahlin et al., "Flash® CS4 All-in-One For Dummies®," Dec. 3, 2008, John Wiley & Sons, 4 pages.
Shen, C., "Interactive tabletops: User Interface, Metaphors and Gestures," SIGGRAPH2007, Aug. 2007, 14 pages.
Shen et al., "Informing the Design of Direct-Touch Tabletops," IEEE Sep./Oct. 2006, pp. 36-46.
Tse et al., "Enabling Interaction with Single User Applications through Speech and Gestures on a Multi-User Tabletop," Mitsubishi Electric Research Laboratories, Dec. 2005, 9 pages.
Ullmer et al., "The metaDESK: Models and Prototypes for Tangible User Interfaces," UIST '97, Oct. 1997, Banff, Alberta, Canada, 10 pages.
Wilson, A., "Robust Computer Vision-Based Detection of Pinching for One and Two-Handed Gesture Input," UIST '06, Oct. 2006, Montreux, Switzerland, 4 pages.
Wu, et al., "Multi-Finger and Whole Gestural Interaction Techniques for Multi-User Tabletop Displays," UIST '03, Nov. 5-7, 2003, Vancouver, BC, Canada, © ACM 2003, 10 pages.
Yee, K., "Two-Handed Interaction on a Tablet Display," SIGCHI 2004, Apr. 2004, Vienna, Austria, 4 pages.
YouTube, "A Multi-Touch Three Dimensional Touch-Sensitive Tablet," 3 minute video uploaded to YouTube by wasbuxton on Nov. 18, 2009, http://www.youtube.com/watch?v=Arrus9CxUIA, 3 pages.
YouTube, "3d desktop," 6:50 minute video uploaded to YouTube by frankcde on Sep. 18, 2006, http://www.youtube.com/watch?v=j_lxBwvf3Vk&feature=related, 2 pages.
YouTube, "Auto Design on Jeff Han's Perceptive Pixel Muiti-Touch,"2:11 minute video uploaded to YouTube by AutodeskLabs on Jul. 27, 2007, http://www.youtube.com/watch?v=O7ENumwMohs&feature=related, 2 pages.
YouTube, "Cubit—Open Source Multi-touch Display," 5:04 minute video uploaded to YouTube by Krisharava on May 2, 2008, http://www.youtube.com/watch?v=RJTVULGnZQ0, 3 pages.
YouTube, "Gesture Registration, Relaxation, and Reuse for Multi-Point," 4:22 minute video uploaded to YouTube by tabletopresearch201 on May 19, 2008, http://www.youtube.com/watch?v=dT4dXuah2yM, 2 pages.
YouTube, "HP TouchSmart tx2—Multi-Touch Part 2," 0:15 minute video uploaded to YouTube by unwirelife on December 19, 2008, http://www.youtube.com/watch?v=Yon3vRwc94A, 3 pages.
YouTube, "13 MultiTouch Interactive Table," 2;15 minute video uploaded by i3pgroup on Nov. 16, 2007, http://www.youtube.com/watch?v=M2oijV-bRrw&feature=related, 2 pages.
YouTube, "IdentityMine's multitude of Multi-Touch apps," 3:27 minute video uploaded to YouTube by ContinuumShow on Nov. 6, 2008, http://www.youtube.com/watch?v=HcpdNb9Lhns, 3 pages.

(56) References Cited

OTHER PUBLICATIONS

YouTube, "Jeff Han's 8ft. Multi-Touch Display Wall," 4:39 minute video uploaded to YouTube by aiai6666 on May 16, 2007, http://www.youtube.com/watch?v=JfFwgPuEdSk&feature=related, 2 pages.
YouTube, "LG.Philips 52-inch multi-touch display," 1:36 minute video uploaded to YOUTube by engadget on Jan. 8, 2008, http://www.youtube.com/watch?v=9qO-diu4jq4&feature=related. 2 pages.
YouTube, "Lucid Touch: a See-Through Multi-Touch Mobile Device," 3:29 minute video upload by dwigdor Aug. 21, 2007, http://www.youtube.com/watch?v=qbMQ7urAvuc, 2 pages.
YouTube, "Microsoft Surface Demo," 2:10 minute video uploaded to YouTube by zac96 on Aug. 17, 2007, http://www.youtube.com/watch?v=rKgU6ubBgJA&feature=related, 2 pages.
YouTube, "Microsoft Surface Demo @ CES 2008," 9:58 minute video uploaded to YouTube by GerbiBod7 on Jan. 8, 2008, http://www.youtube.com/watch?v=Zxk_WywMTzc&feature=rleated, 2 pages.
YouTube, "Minority Report Interface Protype," 1:52 minute video uploaded to YouTube by aievalli on Jul. 12, 2006, http://www.youtube.com/watch?v=3bn-zZ9kdc, 3 pages.
YouTube, "Multi-touch Interaction: Browser Control,"1:12 minute video uploaded to YouTube by HCiKonstanz on Sep. 12, 2008, http://www.youtube.com/watch?v=jTOK5Zbfm4U, 2 pages.
YouTube, "Multi-touch interface (from Adobe TED),"9:33 minute video uploaded to YouTube by f0xmuld3r on Aug. 3, 2006, http://www.youtube.com/watch?v=UcKqyn-gUbY, 2 pages.
YouTube, "Multi Touch (new touchscreen technology)," 3:31 minute video uploaded to YouTube by chanfrado on Mar. 17, 2006, http://www.youtube.com/watch?v=1ftJhDBZqss&feature=related, 2 pages.
YouTube, "Multi-touch Time and Geo Tagging Photosharing with IntuiFace," 2:21 minute video uploaded to YouTube by IntuiLab on Jan. 31, 2008, http://www.youtube.com/watch?v=ftsx21liFvo, 3 pages.
YouTube, "PhotoApp (Multi-Touch)," 1:45 video uploaded to YouTube by NePsihus on Dec. 30, 2007http://www.youtube.com/watch?v=RJTVULGnZQ0, 3 pages.
YouTube, "Photoshop MT-Desktop Digital Imaging on FTIR multitouch," 5:38 minute video uploaded to YouTube by thomasglaeser on Feb. 7, 2007, http://www.youtube.com/watch?v=JmHNr9EH1iU&feature=related, 2 pages.
YouTube, "Photo Touch: Multi-touch Photo Organization for your Mac," 8:03 minute video uploaded to YouTube by cocoadex on Mar. 30, 2008. http://www.youtube.com/watch?v=D7x7jV3P1-0, 3 pages.
YouTube, "Smart Surface Beta," 1:56 minute video uploaded to YouTube by vanderlin on Mar. 29, 2008, http://www.youtube.com/watch?v=68wFqxdXENw&feature=related, pages.
YouTube, "TDesk Multiuser," 1:11 minute video uploaded to YouTube by bestsheep1 on Sep. 6, 2007, http://www.youtube.com/watch?v=PjsO-lbll34&feature=related, 2 pages.
YouTube, "Wii Multi-touch Photo Gallery," 1:25 minute video uploaded to YouTube by darthstoo on Apr. 10, 2008, http://www.youtube.com/watch?v=0CYVxQ2OM9s, 3 pages.
Invitation to Pay Additional Fees dated Apr. 29, 2010, received in International Application No. PCT/US2009/057899, which coresponds to U.S. Appl. No. 12/567,405, 8 pages (Victor).
International Search Report and Written Opinion dated Jun. 14, 2010, received in International Application No. PCT/US2009/057899, which corresponds to U.S. Appl. No. 12/567,405, 23 pages (Victor).
International Search Report and Written Opinion dated Jul. 1, 2011, received in International Application No. PCT/US2011/022519, which corresponds to U.S. Appl. No. 12/790,504, 11 pages (Capela).
International Search Report and Written Opinion dated Dec. 13, 2011, received in International Patent Application No. PCT/US2011/045552, which corresponds to U.S. Appl. No. 12/848,067, 12 pages (Migos).
Office Action dated May 17, 2012, received in U.S. Appl. No. 12/567,405, 21 pages (Victor).
Office Action dated Aug. 4, 2011, recieved in U.S. Appl. No. 12/567,460, 14 pages (Victor).
Notice of Allowance dated Jan. 18, 2012, received in U.S. Appl. No. 12/567,460, 8 pages (Victor).
Notice of Allowance dated Aug. 10, 2012, received in U.S. Appl. No. 12/567,460, 14 pages (Victor).
Office Action dated Sep. 16, 2011, reveived in U.S. Appl. No. 12/567,553, 12 pages (Victor).
Final Office Action dated Mar. 12, 2012, reveived in U.S. Appl. No. 12/567,553, 15 pages (Victor).
Notice of Allowance dated Jun. 12, 2012, received in U.S. Appl. No. 12/567,553, 8 pages (Victor).
Notice of Allowance dated Aug. 10, 2012, received in U.S. Appl. No. 12/567,553, 13 pages (Victor).
Office Action dated Oct. 3, 2012, reveived in U.S. Appl. No. 12/790,504, 23 pages (Capela).
Office Action dated Nov. 7, 2012, received in U.S. Appl. No. 12/790,508, 33 pages (Capela).
Office Action dated Aug. 9, 2012, received in U.S. Appl. No. 12/848,063, 14 pages (Migos).
Office Action dated Jun. 6, 2012, received in U.S. Appl. No. 12/848,067, 17 pages (Migos).
Office Action dated Jun. 29, 2012, received in U.S. Appl. No. 12/848,074, 12 pages (Migos).
Apple.com, "Pages Keyboard Shortcuts," Apple.com, downloaded Jan. 18, 2010, http://www.apple.com/support/pages/shortcuts/, 6 pages.
Baudisch, P., "The Cage: Efficient Construction in 3D using a Cubic Adaptive Grid," Proceedings of the 9th Annual ACM Symposium on User Interface Software and Technology, Nov. 6, 1996, 2 pages.
Cutedraw, "Moving, Rotating, Resizing and Flipping Shapes," Cutedraw.com, 2007, http://www.cutedraw.com/Moving,%20Rotating,%20Resizing%20Flipping%20Shapes.php, 5 pages.
Faas, R., "Spaces: A look at Apple's take on virtual desktops in Leopard," Computerworld, Nov. 21, 2006, http://www.computerworld.com/s/article/print/9005267/Spaces_A_loo . . . tual_desktops_in_Leo parad?taxonomyName . . . , 3 pages.
FingerWorks, "Installation and Operation Guide for the TouchStream," Copyright© 2002, 14 pages, www.fingerworks.com.
FingerWorks, "Quick Reference Guide for IGesture Products," Copyright© 1999-2002, 4 pages, www.fingerworks.com.
FingerWorks, "Quick Reference Guide for TouchStream ST/LP," Copyright© 2001-2003, 4 pages, www.fingerworks.com.
FingerWorks, "Installation and Operation Guide for Igesture Products w/Keys, " Copyright© 2002, 10 pages, www.fingerworks.com.
FingerWorks, "TouchStream LP Silver," Apr. 27, 2005, 18 pages, http://www.fingerworks.com.
FingerWorks Forums, "Finger works Support Forums—Product Comments—TouchStream KeyBoards—Is the Multitouch Lemur," Dec. 24, 2004, http://64233.167.104/search?q=cache:sjVdtyFBvRMJ:forums.finger. 2 pages.
Google docs, "Drawings: Moving, resizing and rotating objects," Google.com, downloaded Jan. 18, 2010, http://docs.google.com/support/bin/answer.py?hl=en&answer=141914, 1 pages.
Hudson, S., "Adaptive Semantic Snapping—A technique for Semantic Feedback at the Lexical Level," Proceedings of the ACM CHI 90 Human Factors in Computing Systems Conference Apr. 1990, Seattle, Washington, 6 pages.
IBM, "Resizing shapes by dragging sizing handles," IBM WebSphere Help System, 1999, http://publib.boulder.ibm.com/infocenter/wsadhelp/v5r1m2/index.jsp?topic=/com.rational.xtools.umivisualizer.doc/topics/tresizedrag.html, 1 page.
Kane et al., "Slide Rule: Making Mobile Touch Screens Accessible to Blind People Using Multi-Touch Interaction Techniques," Proceedings of ACM SIGACCESS Conference on Computers and Accessibility, Halifax, Nova Scotia, Canada, Oct. 2008, 8 pages.
Karsenty at al., "Inferring Graphical Constraints with Rockit," Digital-Paris Research Laboratory, Mar. 1992, www.hpl.hp.com/techreports/Compaq-DEC/PRL-RR-17.pdf, 30 pages.

(56) References Cited

OTHER PUBLICATIONS

Microsoft.com, "Quickly copy formatting with the Format Painter," Microsoft.com, 2003, http://office.microsoft.com/enus/help/HA012176101033.aspx, 1 page.

Microsoft.com, "Resize an object," Microsoft Office Online, 2010, http://office.microsoft.com/en-us/publisher/HP051139751033.aspx, 2 pages.

Mueller et al "Visio 2007 for Dummies," John Wiley & Sons, Dec. 2006, pp. 178-181.

Murphy, P. "Review: SBSH Calendar Touch," justanothermobilemonday.com, Dec. 8, 2008, http://justanothermobilemonday.com/Wordpress/2008/12/08/review-sbsh-calendar-touch/, 7 pages.

Westerman, W., "Hand Tracking Finger Identification and Chordic Manipulation on a Multi-touch Surface." Doctoral Dissertation, submitted Spring 1999, 363 pages.

Wikipedia, "Spaces (software)," Wikipedia, the free encyclopedia, Jul. 15, 2009, http://en.wikipedia.org/wiki/Spaces_(software), 3 pages.

Wikipedia, "Virtual desktop," Wikipedia, the free encyclopedia, Jul. 20, 2009, http://en.wikipedia.org/wiki/Virtual_desktop, 3 pages.

International Search Report and Written Opinion dated Apr. 27, 2011, received in International Application No. PCT/US2011/022525, which corresponds to U.S. Appl. No. 12/790,508.

International Search Report and Written Opinion dated May 24, 2011, received in International Application No. PCT/US2011/022532, which corresponds to U.S. Appl. No. 12/790,524, 18 pages (Capela).

International Preliminary Report on Patentability dated Feb. 14, 2013, received in International Application No. PCT/US2011/045552, which corresponds to U.S. Appl. No. 12/848,067, 8 pages (Migos).

Final Office Action dated Dec. 17, 2012, received in U.S. Appl. No. 12/567,405, 19 pages (Victor).

Office Action dated Aug. 30, 2012, received in U.S. Appl. No, 12/567,206, 13 pages (Missig).

Final Office Action dated Apr. 4, 2013, received in U.S. Appl. No. 12/567,206, 30 pages (Missig).

Notice of Allowance. dated Aug. 8, 2013, received in U.S. Appl. No. 12/567,206, 8 pages (Missig).

Office Action dated Jun. 7, 2012, received in U.S. Appl. No. 12/768,623, 12 pages (Weeldreyer).

Final Office Action dated Jan. 22, 2013, received in U.S. Appl. No. 12/,768,623, 37 pages (Weeldreyer).

Office Action dated May 30, 2013, received in U.S. Appl. No. 12/768,623, 34 pages (Weeldreyer).

Final Office Action dated Oct. 23, 2013, received in U.S. Appl. No. 12/768,623, 43 pages (Weeldreyer).

Notice of Allowance dated Dec. 24, 2012, received in U.S. Appl. No. 12/567,460, 17 pages (Victor).

Notice of Allowance dated Apr. 10, 2013, received in U.S Appl. No. 12/567,460, 11 pages (Victor).

Notice of Allowance dated Dec. 24, 2012, received in U.S. Appl. No. 12/567,553, 12 pages (Victor).

Notice of Allowance dated Apr. 2, 2013, received in U.S. Appl. No. 12/567,563, 11 pages (Victor).

Notice of Allowance dated Dec. 19, 2012, received in U.S. Appl. No. 12/567,570, 10 pages (Victor).

Notice of Allowance dated Mar. 27, 2013, received in U.S. Appl. No. 12/567,570, 11 pages (Victor).

Final Office Action dated Apr. 1, 2013, received in U.S. Appl. No. 12/790,504, 29 pages (Capela).

Notice of Allowance dated Aug. 13, 2013, received in U.S. Appl. No. 12/790,504, 21 pages (Capela).

Notice of Allowance dated Jul. 10, 2013, received in U.S. Appl. No. 12/790,508, 21 pages (Capela).

Office Action dated Feb. 2, 2012, received in U.S. Appl. No. 12/790,516, 11 page (Capela).

Office Aciton dated Aug. 27, 2012, received in U.S. Appl. No. 12/790,516, 10 pages (Capela).

Notice of Allowance dated May 15, 2013, received in U.S. Appl. No. 12/790,516, 21 pages (Capela).

Office Action dated Jun. 24, 2013, received in Australian Patent Application No. 2011209729, which corresponds to U.S. Appl. No. 12/790,516, 4 pages (Capela).

Office Action dated Sep. 24, 2012, received in U.S. Appl. No 12/790,524, 23 pages (Capela).

Notice of Allowance dated Feb. 5, 2013, received in U S. Appl. No. 12/790,524, 9 pages (Capela).

Notice of Allowance dated May 13, 2013, received in U.S. Appl. No. 12/790,524, 19 pages (Capela).

Office Action dated Mar. 29, 2013, received in U.S. Appl. No. 12/848,063, 21 pages (Migos).

Final Office Action dated Oct. 11, 2013, received in U.S. Appl. No. 12/848,063, 15 pages (Migos).

Office Action dated Mar. 7, 2013, received in U.S. Appl. No. 12/848,087, 27 pages (Migos).

Final Office Action dated Aug. 22, 2013, received in U.S. Appl. No. 12/848,087, 29 pages (Migos).

Final Office Action dated Jan. 10, 2013, received in U.S. Appl. No. 12/848,067, 43 (Migos).

Final Office Action dated Apr. 3, 2013, received in U.S. Appl. No. 12/848,074, 25 pages (Migos).

Notice of Allowance dated Nov. 8, 2013, received in U.S. Appl. No. 12/790,508, 13 pages (Capela).

Office Action dated Oct. 21, 2013, received in Korean Patent Application No. 2012 7022209, which corresponds to U.S. Appl. No. 12/790,518, 1 page (Capela).

Examiner's Report dated Oct. 21, 2013, received in Australian Patent Application No. 2011282703, which corresponds to U.S. Appl. No. 12/848,067, 3 pages (Migos).

\* cited by examiner

DEVICE, METHOD, AND GRAPHICAL USER INTERFACE FOR MOVING A CALENDAR ENTRY IN A CALENDAR APPLICATION

TECHNICAL FIELD

The disclosed embodiments relate generally to calendar applications in electronic devices with touch-sensitive surfaces. More particularly, the disclosed embodiments relate to repositioning a calendar entry within a calendar application on such devices.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects in user interfaces for multifunction devices.

For example, while using a calendar application, a user may wish to reposition a user interface object that represents a calendar entry (e.g., an appointment) from its current date/time to a new date/time. Exemplary calendar applications include iCal from Apple, Inc., Outlook from Microsoft, Inc. and Lotus Notes from IBM, Inc.

But existing methods for manipulating calendar entries are cumbersome and inefficient. For example, moving a calendar entry from one date/time to another date/time may require manually entering the new date and time in a date/time field or opening two windows where one of the windows displays the current date/time while the other window displays the new date/time. Such manipulations are tedious and create a significant cognitive burden on a user. In addition, conventional methods take longer than necessary, thereby wasting energy. This latter consideration is particularly important in battery-operated devices.

Accordingly, there is a need for electronic devices with faster, more efficient methods and interfaces for quickly and efficiently repositioning calendar entries within a calendar application. Such methods and interfaces may complement or replace existing methods for repositioning calendar entries. Such methods and interfaces reduce the cognitive burden on a user and produce a more efficient human-machine interface. For battery-operated electronic devices, such methods and interfaces conserve power and increase the time between battery charges.

SUMMARY

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, a tablet, or a handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, in addition to the calendar application, the functions include one or more of: image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a computer-implemented method is performed at a multifunction device with a display and a touch-sensitive surface. The method includes displaying a multi-week view in a calendar application on the display; detecting a first input by a user and, in response to detecting the first input by the user, selecting a first calendar entry in the multi-week view in the calendar application. The method also includes, while continuing to detect selection of the first calendar entry by the user: detecting a first multifinger gesture on the touch-sensitive surface and, in response to detecting the first multifinger gesture on the touch-sensitive surface: expanding display of a single week in the multi-week view and maintaining display of the first calendar entry on the display. The method also includes, while continuing to detect selection of the first calendar entry by the user, moving the first calendar entry to a date and time in the calendar application in accordance with a second input by the user.

In accordance with some embodiments, a graphical user interface on a multifunction device with a display and a touch-sensitive surface includes: a multi-week view in a calendar application and a first calendar entry in the multi-week view. In response to detecting a first input by a user, the first calendar entry in the multi-week view in the calendar application is selected. While continuing to detect selection of the first calendar entry by the user, in response to detection of a first multifinger gesture on the touch-sensitive surface, display of a single week in the multi-week view is expanded and display of the first calendar entry on the display is maintained. Additionally, while continuing to detect selection of the first calendar entry by the user, the first calendar entry is moved to a date and time in the calendar application in accordance with a second input by the user.

In accordance with some embodiments, a multifunction device includes: a display; a touch-sensitive surface; one or more processors; memory; and one or more programs. The one or more programs are stored in the memory and configured to be executed by the one or more processors. The one or more programs include instructions for: displaying a multi-week view in a calendar application on the display; detecting a first input by a user; and responding to detection of the first input by the user by selecting a first calendar entry in the multi-week view in the calendar application. The one or more programs also include instructions for, while continuing to detect selection of the first calendar entry by the user: detecting a first multifinger gesture on the touch-sensitive surface; and responding to detection of the first multifinger gesture on the touch-sensitive surface by expanding display of a single week in the multi-week view and maintaining display of the first calendar entry on the display. The one or more programs also include instructions for, while continuing to detect selection of the first calendar entry by the user, moving the first calendar entry to a date and time in the calendar application in accordance with a second input by the user.

In accordance with some embodiments, a computer readable storage medium stores one or more programs. The one or more programs include instructions, which when executed by a multifunction device with a display and a touch-sensitive surface, cause the device to: display a multi-week view in a calendar application on the display; detect a first input by a user; and respond to detection of the first input by the user by selecting a first calendar entry in the multi-week view in the calendar application. While continuing to detect selection of the first calendar entry by the user, the one or more instructions also cause the device to: detect a first multifinger gesture on the touch-sensitive surface; and respond to detection of the first multifinger gesture on the touch-sensitive surface by: expanding display of a single week in the multi-week view and maintaining display of the first calendar entry on the display. The instructions also cause the device, while continuing to detect selection of the first calendar entry by the user, to move the first calendar entry to a date and time in the calendar application in accordance with a second input by the user.

In accordance with some embodiments, a multifunction device comprises: a display; a touch-sensitive surface; means for displaying a multi-week view in a calendar application on the display; means for detecting a first input by a user; and means, responsive to detection of the first input by the user, for selecting a first calendar entry in the multi-week view in the calendar application. While continuing to detect selection of the first calendar entry by the user, the multifunction device also includes: means for detecting a first multifinger gesture on the touch-sensitive surface; and, in response to detecting the first multifinger gesture on the touch-sensitive surface: means for expanding display of a single week in the multi-week view and means for maintaining display of the first calendar entry on the display. While continuing to detect selection of the first calendar entry by the user, the multifunction device also includes means for moving the first calendar entry to a date and time in the calendar application in accordance with a second input by the user.

In accordance with some embodiments, an information processing apparatus for use in a multifunction device with a display and a touch-sensitive surface, includes: means for displaying a multi-week view in a calendar application on the display; means for detecting a first input by a user; and means, responsive to detection of the first input by the user, for selecting a first calendar entry in the multi-week view in the calendar application. While continuing to detect selection of the first calendar entry by the user, the multifunction device also includes: means for detecting a first multifinger gesture on the touch-sensitive surface; and, in response to detecting the first multifinger gesture on the touch-sensitive surface: means for expanding display of a single week in the multi-week view and means for maintaining display of the first calendar entry on the display. While continuing to detect selection of the first calendar entry by the user, the multifunction device also includes means for moving the first calendar entry to a date and time in the calendar application in accordance with a second input by the user.

In accordance with some embodiments, a computer-implemented method is performed at a multifunction device with a display and a touch-sensitive surface. The method includes displaying a multi-week view in a calendar application on the display and detecting a first multifinger gesture on the touch-sensitive surface. In response to detecting the first multifinger gesture on the touch-sensitive surface, the method also includes replacing display of the multi-week view with display of a single-week view in the calendar application.

In accordance with some embodiments, a graphical user interface on a multifunction device with a display and a touch-sensitive surface includes: a multi-week view in a calendar application on the display and a single-week view in the calendar application. In response to detecting a first multifinger gesture on the touch-sensitive surface, display of the multi-week view is replaced with display of the single-week view in the calendar application.

In accordance with some embodiments, a multifunction device includes: a display; a touch-sensitive surface; one or more processors; memory; and one or more programs. The one or more programs are stored in the memory and configured to be executed by the one or more processors. The one or more programs include instructions for: displaying a multi-week view in a calendar application on the display; detecting a first multifinger gesture on the touch-sensitive surface; and responding to detection of the first multifinger gesture on the touch-sensitive surface by replacing display of the multi-week view with display of a single-week view in the calendar application.

In accordance with some embodiments, a computer readable storage medium stores one or more programs. The one or more programs include instructions, which when executed by a multifunction device with a display and a touch-sensitive surface, cause the device to: display a multi-week view in a calendar application on the display; detect a first multifinger gesture on the touch-sensitive surface; and respond to detection of the first multifinger gesture on the touch-sensitive surface by replacing display of the multi-week view with display of a single-week view in the calendar application.

In accordance with some embodiments, a multifunction device includes: a display; a touch-sensitive surface; means for displaying a multi-week view in a calendar application on the display; means for detecting a first multifinger gesture on the touch-sensitive surface; and means, responsive to detection of the first multifinger gesture on the touch-sensitive surface, for replacing display of the multi-week view with display of a single-week view in the calendar application.

In accordance with some embodiments, an information processing apparatus for use in a multifunction device with a display and a touch-sensitive surface includes: means for displaying a multi-week view in a calendar application on the display; means for detecting a first multifinger gesture on the touch-sensitive surface; and means, responsive to detection of the first multifinger gesture on the touch-sensitive surface, for replacing display of the multi-week view with display of a single-week view in the calendar application.

Thus, electronic devices with touch-sensitive surfaces are provided with faster, more efficient methods and interfaces for manipulating a calendar application, thereby increasing the effectiveness, efficiency, and user satisfaction with such devices. Such methods and interfaces may complement or replace existing methods for repositioning calendar entries in a calendar application.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
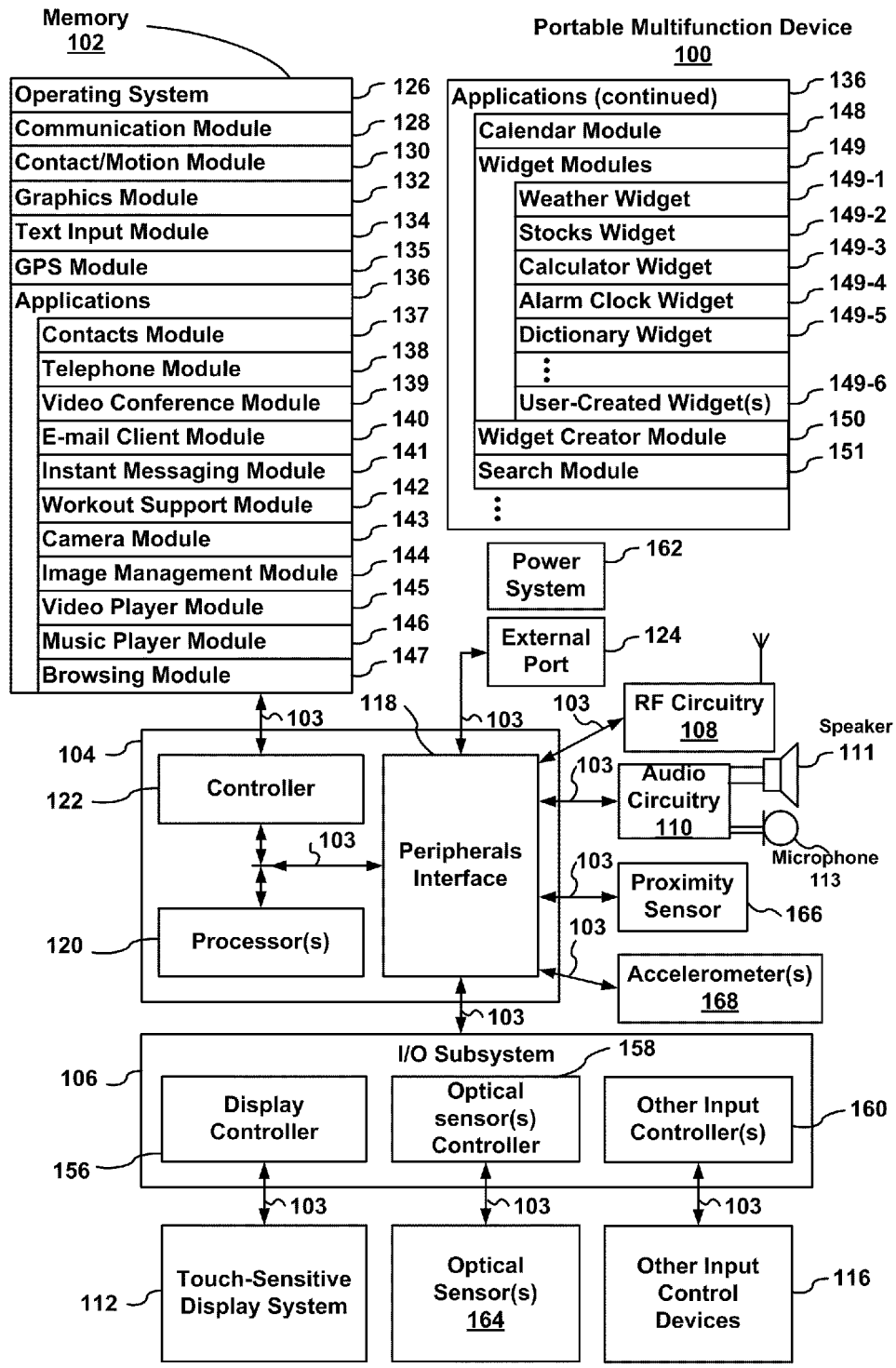
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple, Inc. of Cupertino, Calif.

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications in addition to the calendar application, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
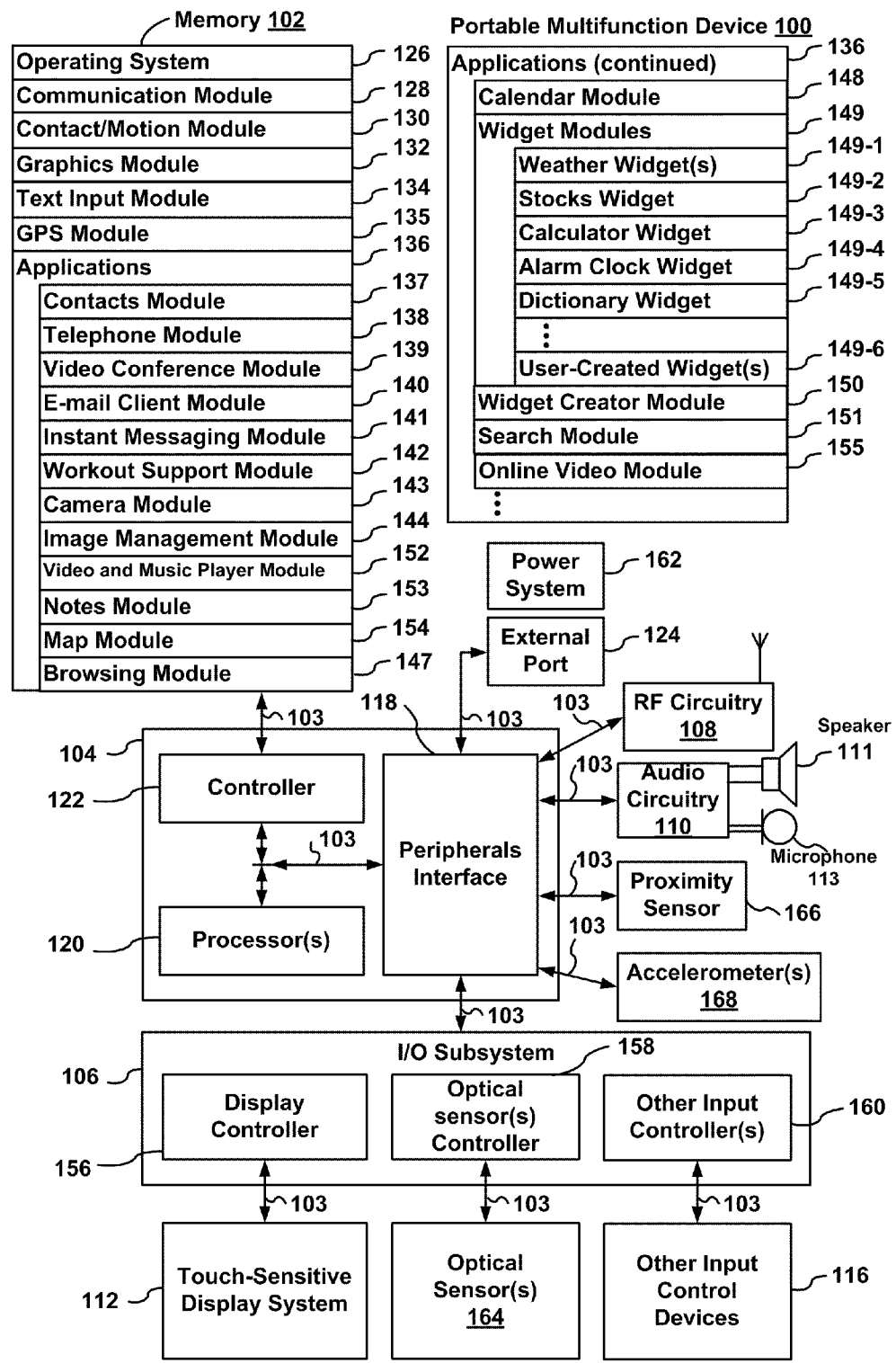

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple, Inc. of Cupertino, Calif.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call).

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up event.

In some embodiments, the contact/motion module 130 (FIG. 3) detects finger gestures, and characterizes the finger gestures to determine whether the finger gestures are associated with specific elements in the user interface (e.g., calendar events) or are part of a multifinger gesture (e.g., a pinching or depinching gesture) for changing the context (e.g., from a single-week view to a multi-week view or from a multi-week view to a single-week view) in an application (e.g., a calendar application) on the multifunction device.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which merges video player module 145 and music player module 146;

notes module 153;

map module 154; and/or online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify (e.g., reposition calendar entries to a new date/time), and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
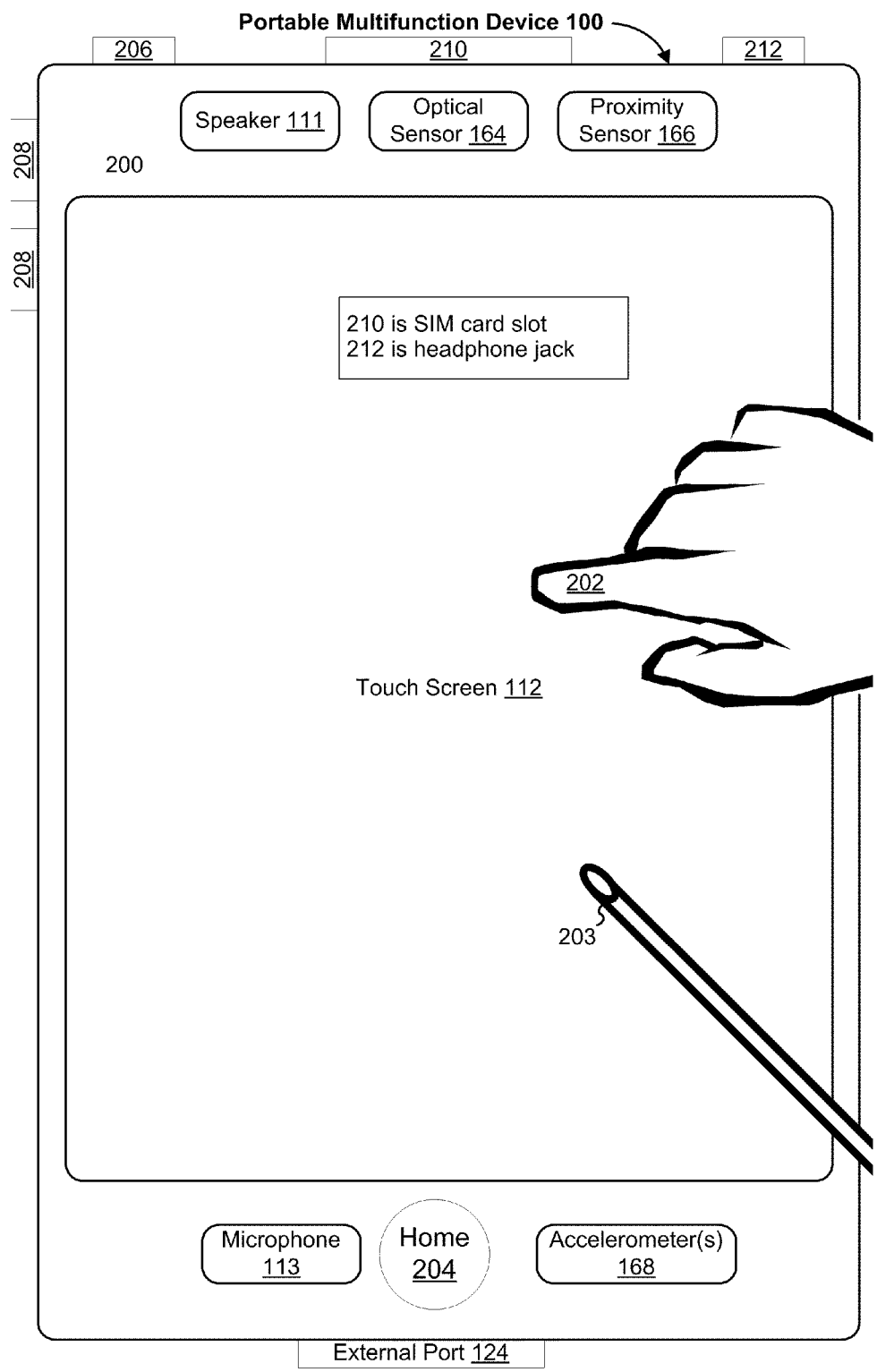
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
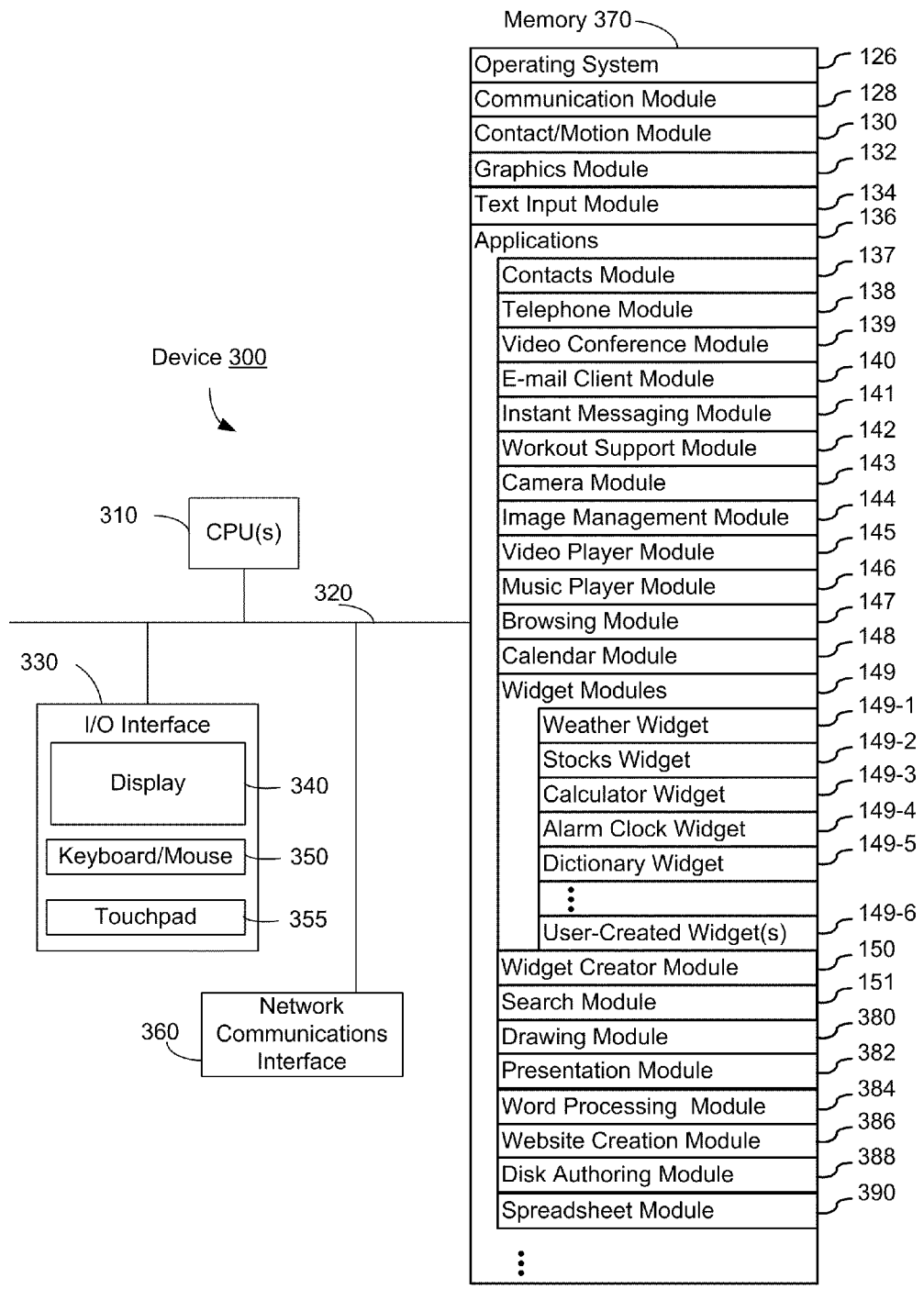
FIG. 3 is a block diagram of an exemplary computing device with a display and a touch-sensitive surface in accordance with some embodiments.

FIG. 3 is a block diagram of an exemplary computing device with a display and a touch-sensitive surface in accordance with some embodiments. Device 300 need not be portable. In some embodiments, the device 300 is a laptop computer, a desktop computer, a table computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which is typically a touch screen display 112. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
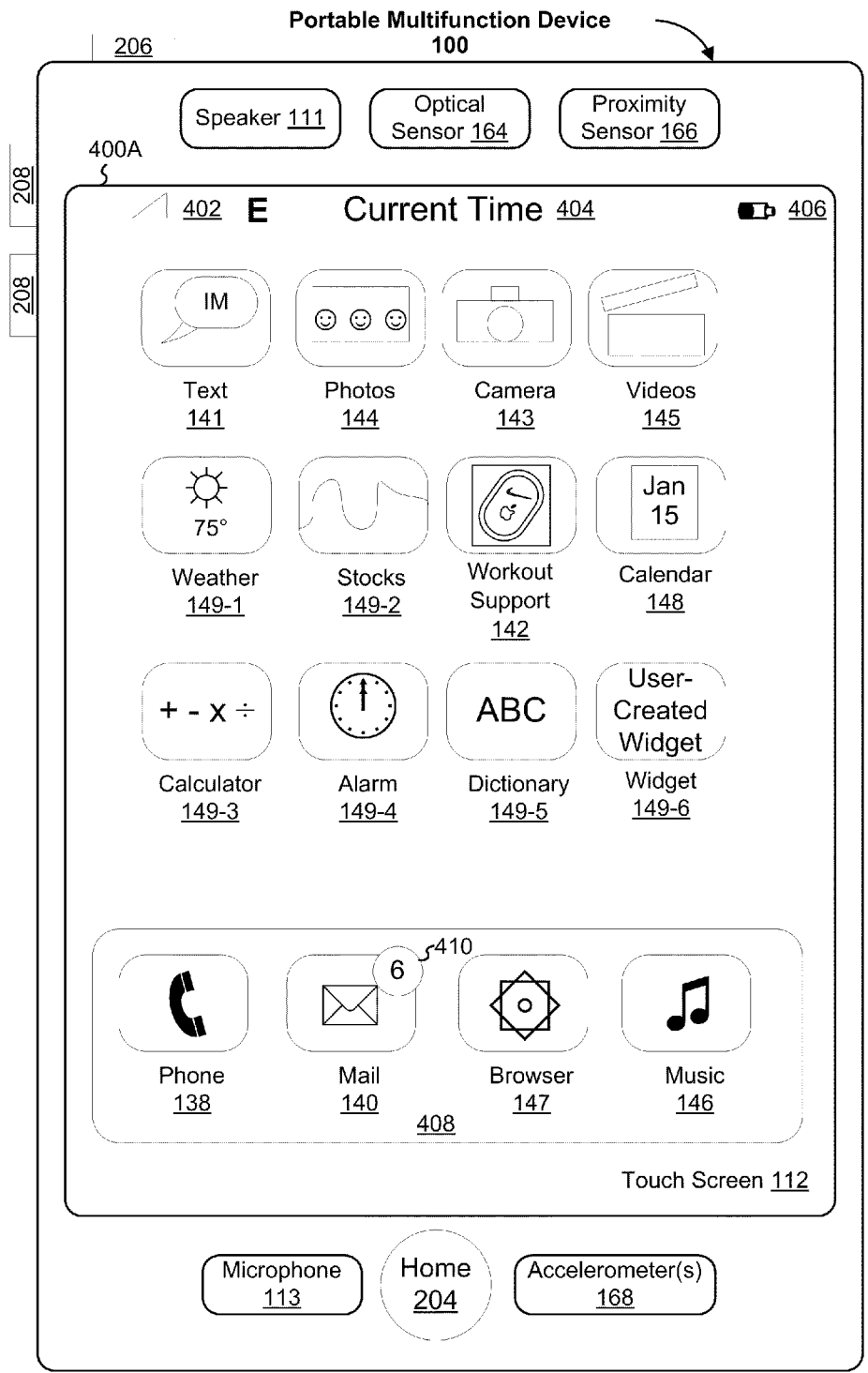
FIGS. 4A and 4B illustrate exemplary user interfaces for a menu of applications on a portable multifunction device in accordance with some embodiments.
Figure 4B:
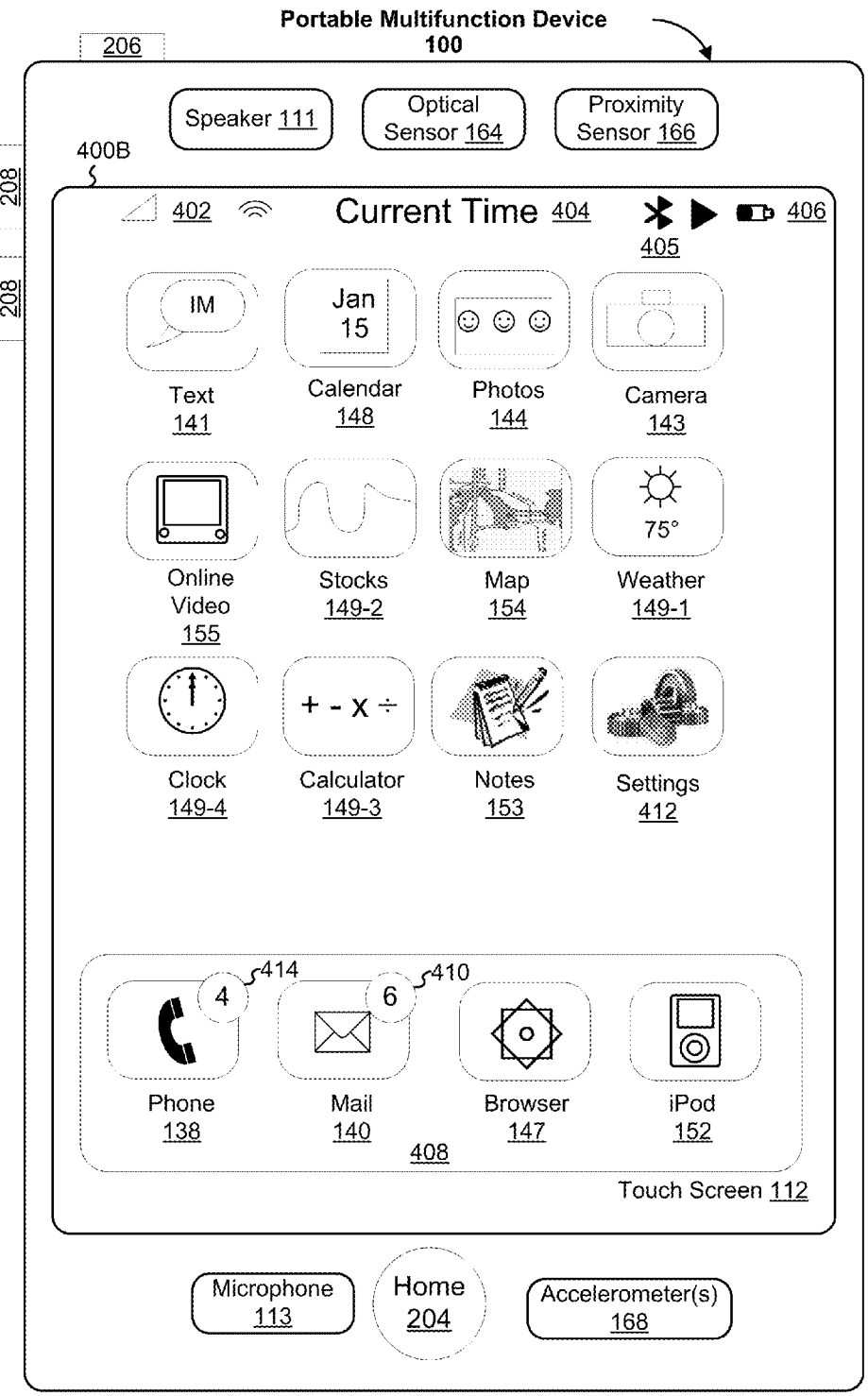

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Phone 138, which may include an indicator 414 of the number of missed calls or voicemail messages;
  - E-mail client 140, which may include an indicator 410 of the number of unread e-mails;
  - Browser 147; and
  - Music player 146; and
- Icons for other applications, such as:
  - IM 141;
  - Image management 144;
  - Camera 143;
  - Video player 145;
  - Weather 149-1;
  - Stocks 149-2;
  - Workout support 142;
  - Calendar 148;
  - Calculator 149-3;
  - Alarm clock 149-4;
  - Dictionary 149-5; and
  - User-created widget 149-6.

In some embodiments, user interface 400B includes the following elements, or a subset or superset thereof:

- 402, 404, 405, 406, 141, 148, 144, 143, 149-3, 149-2, 149-1, 149-4, 410, 414, 138, 140, and 147, as described above;
- Map 154;
- Notes 153;
- Settings 412, which provides access to settings for the device 100 and its various applications 136, as described further below;
- Video and music player module 152, also referred to as iPod (trademark of Apple, Inc.) module 152; and
- Online video module 155, also referred to as YouTube (trademark of Google, Inc.) module 155.

Attention is now directed towards embodiments of user interfaces ("UI") and associated processes that may be implemented on a computing device with a display and a touch-sensitive surface, such as device 300 or portable multifunction device 100.

Figure 5A:
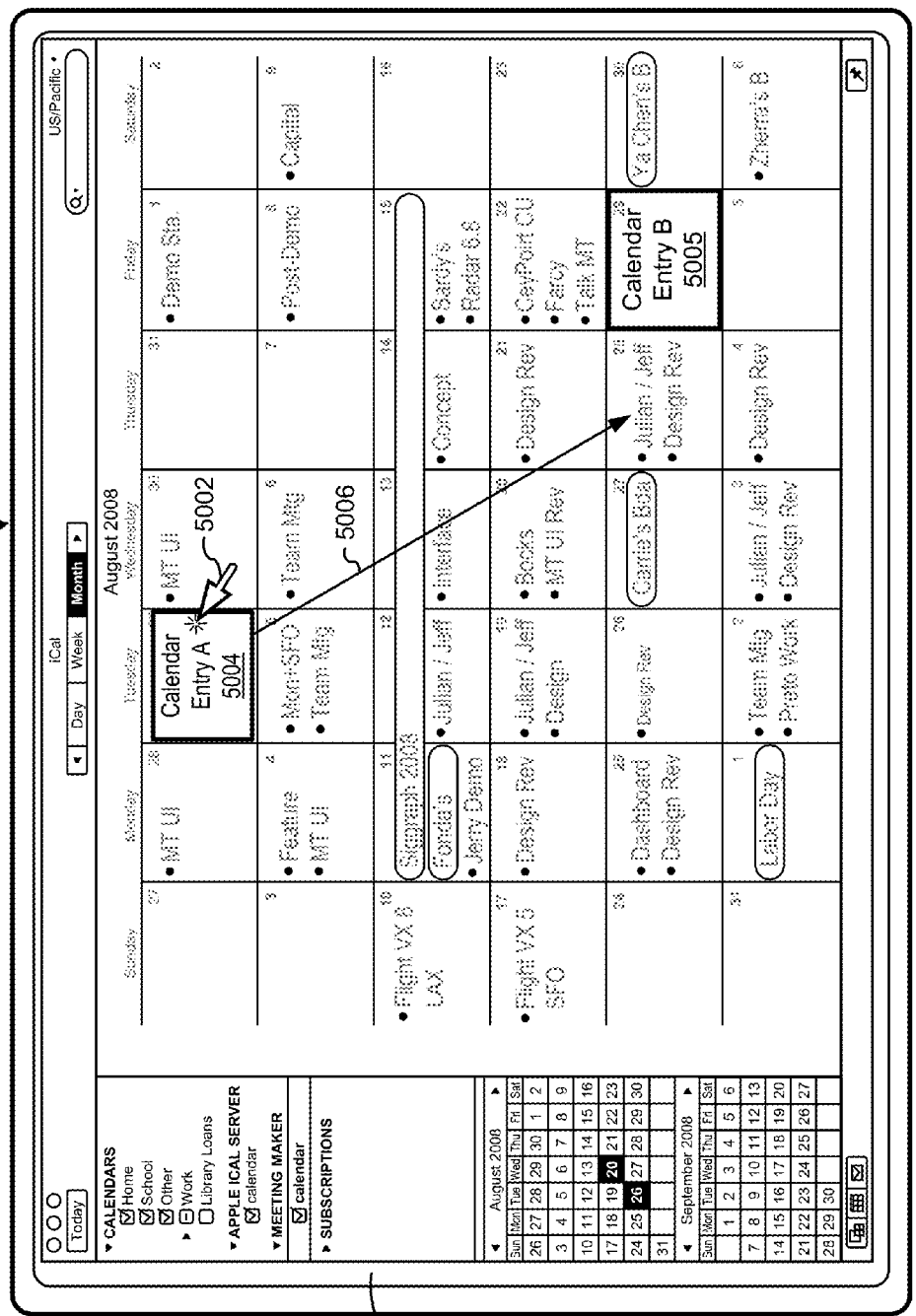
FIGS. 5A-5Q illustrate exemplary user interfaces for repositioning calendar entries in a calendar application in accordance with some embodiments.
Figure 5B:
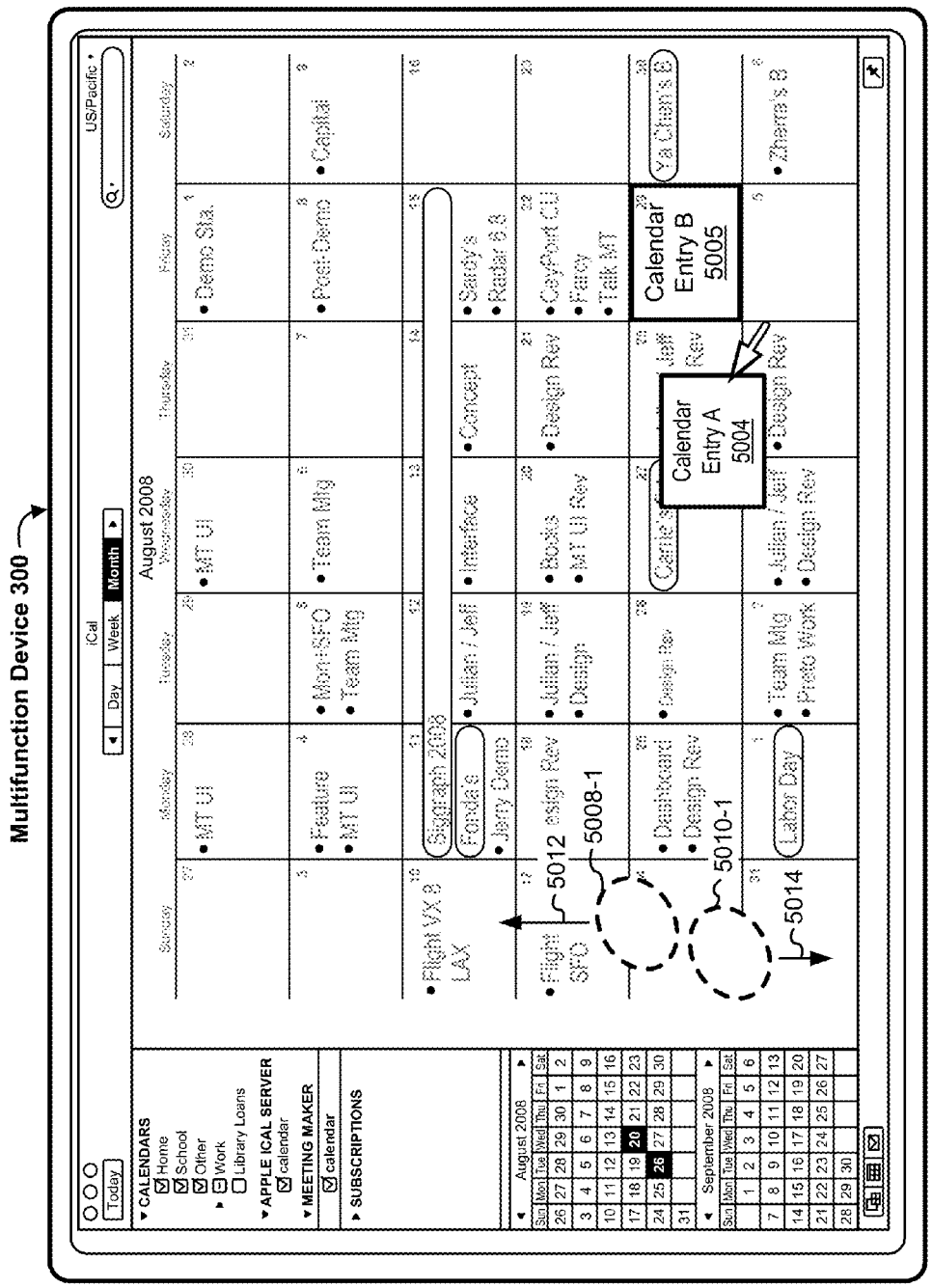
Figure 5C:
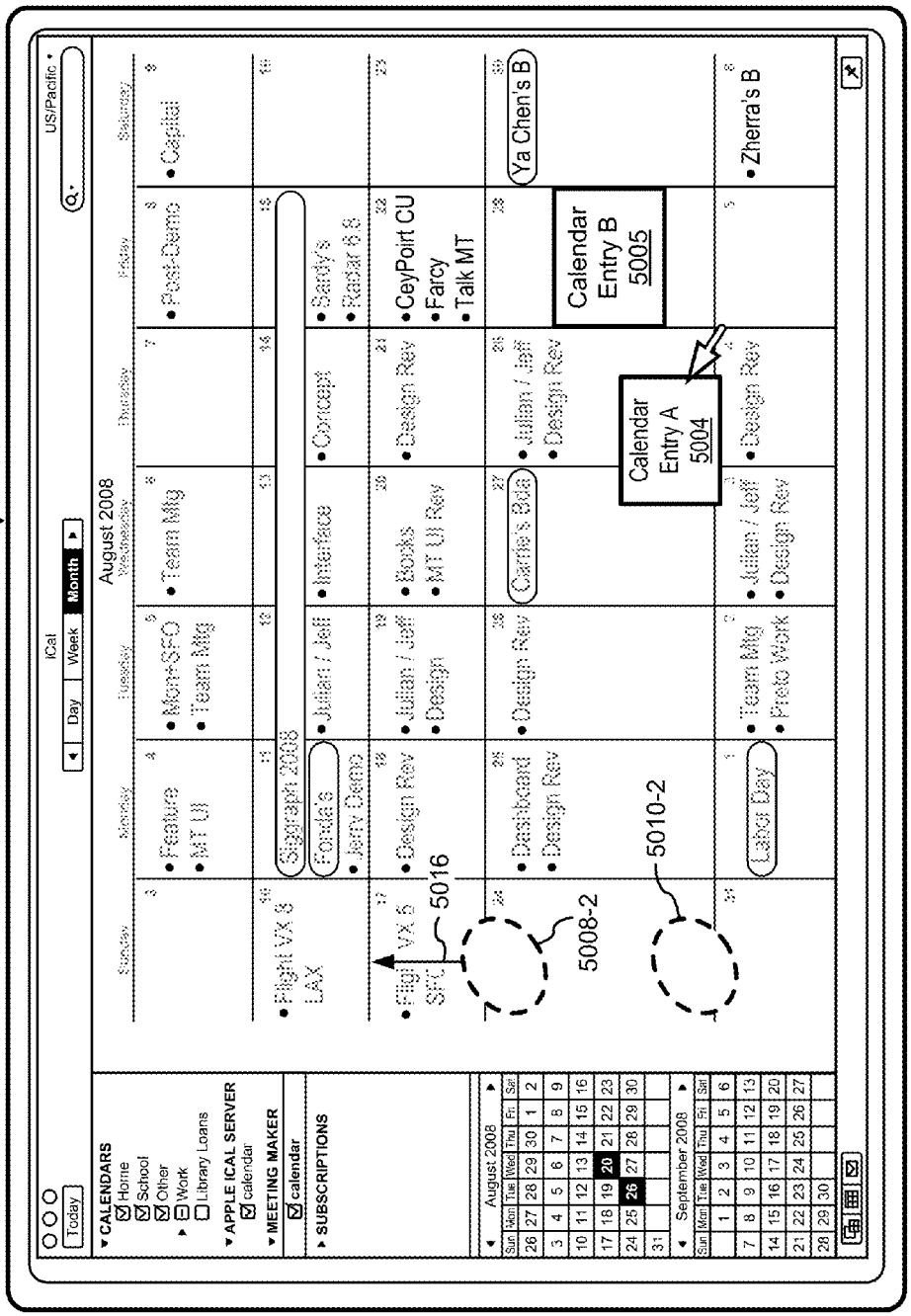
Figure 5D:
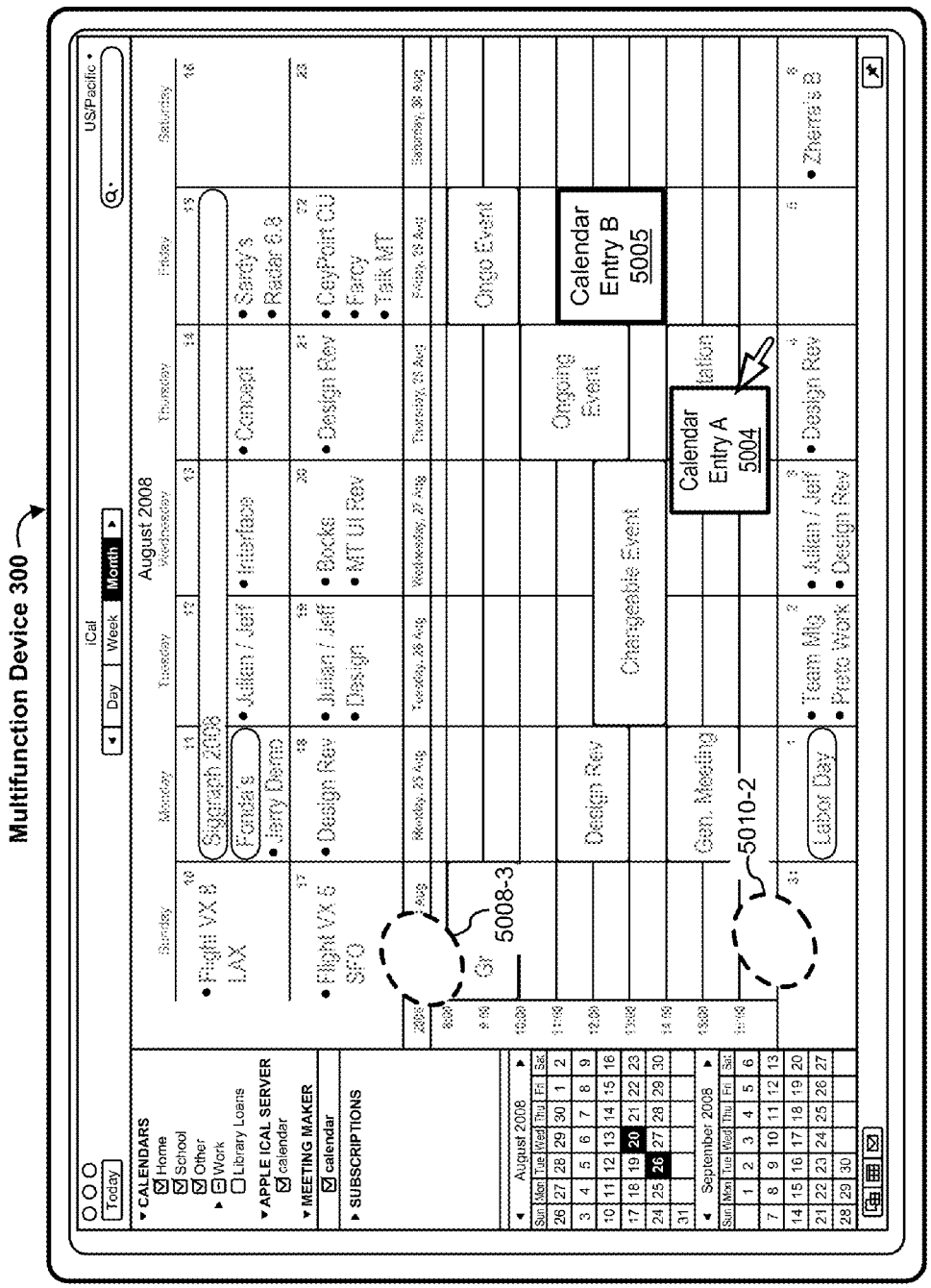
Figure 5E:
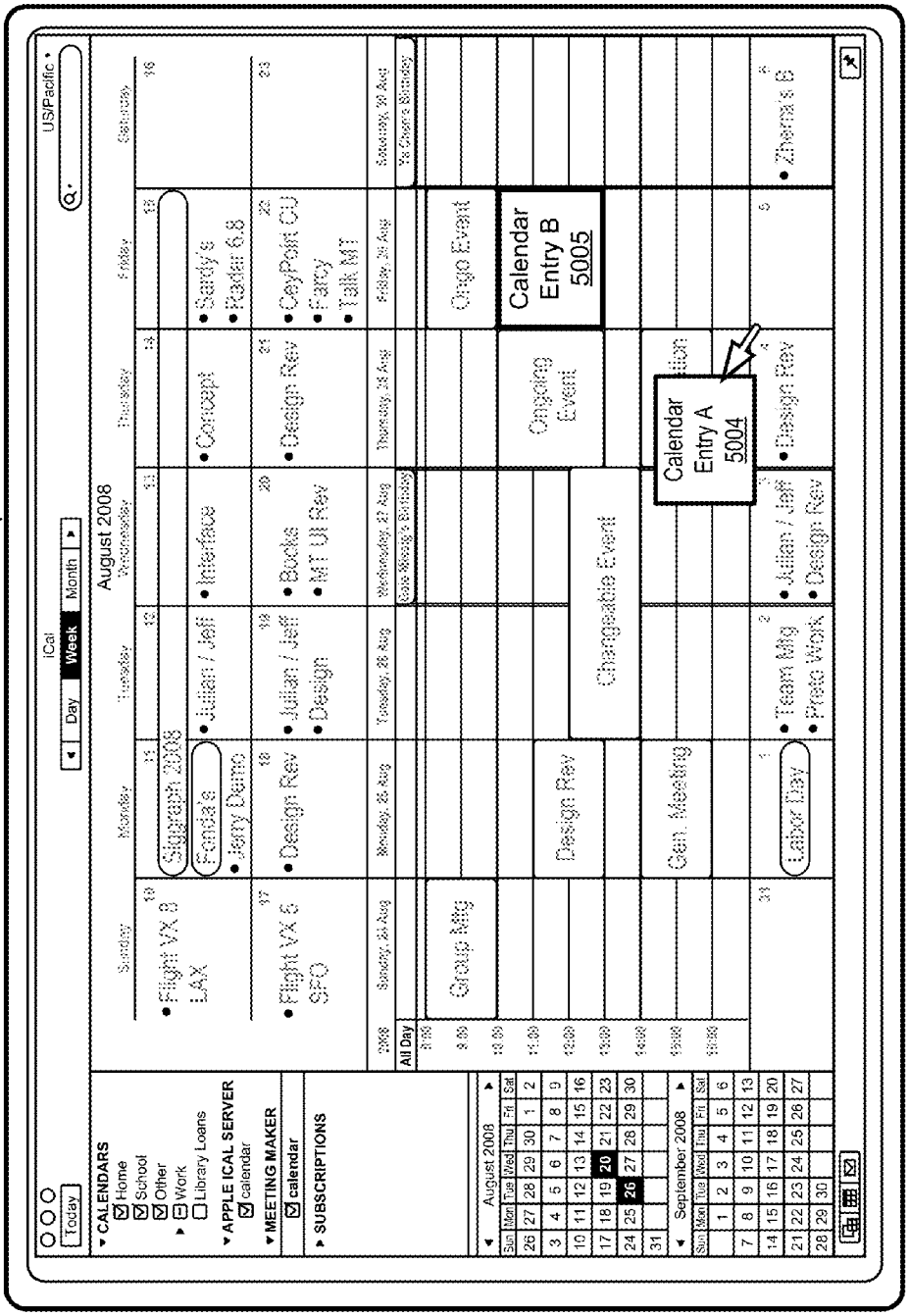
Figure 5F:
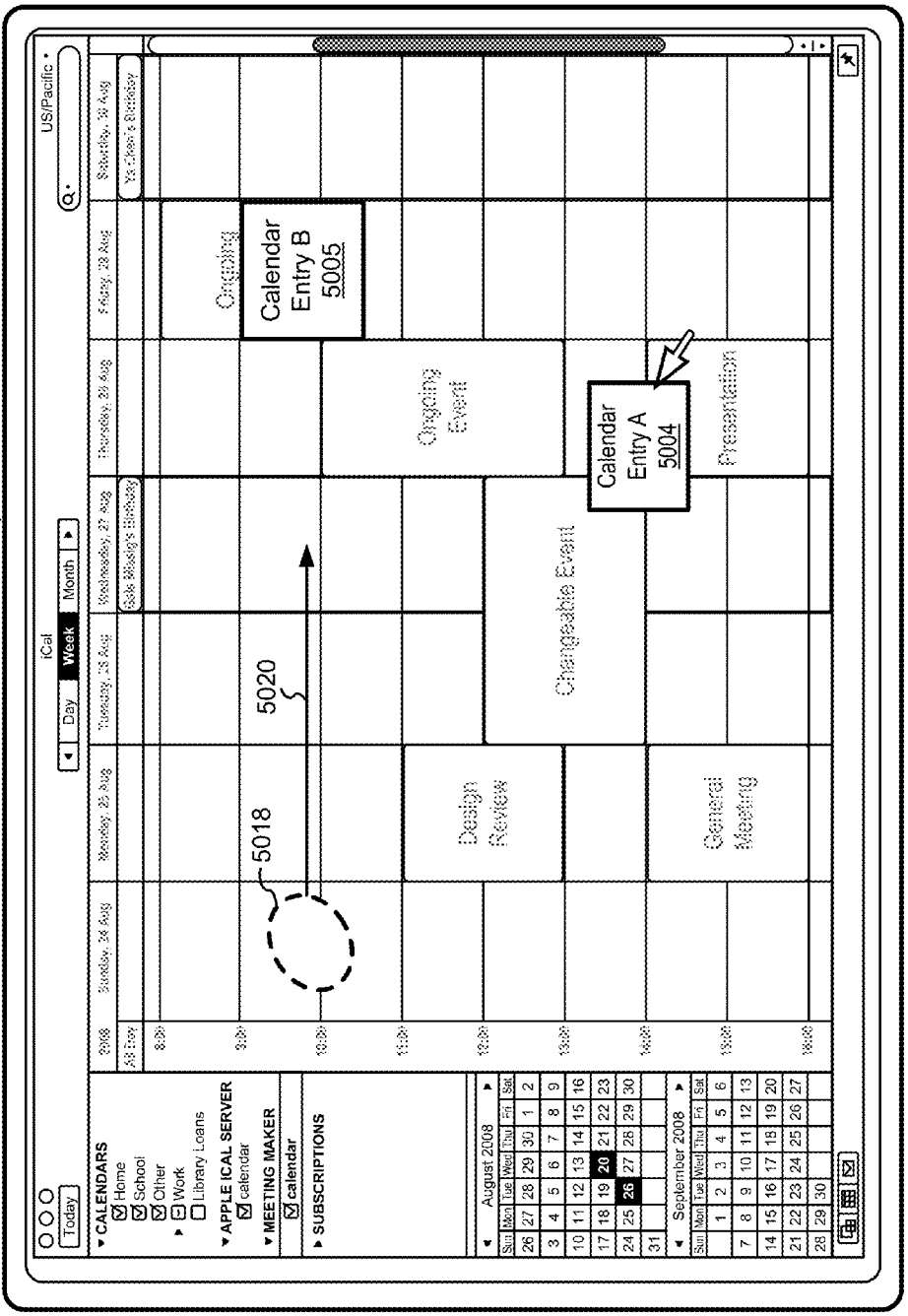
Figure 5G:
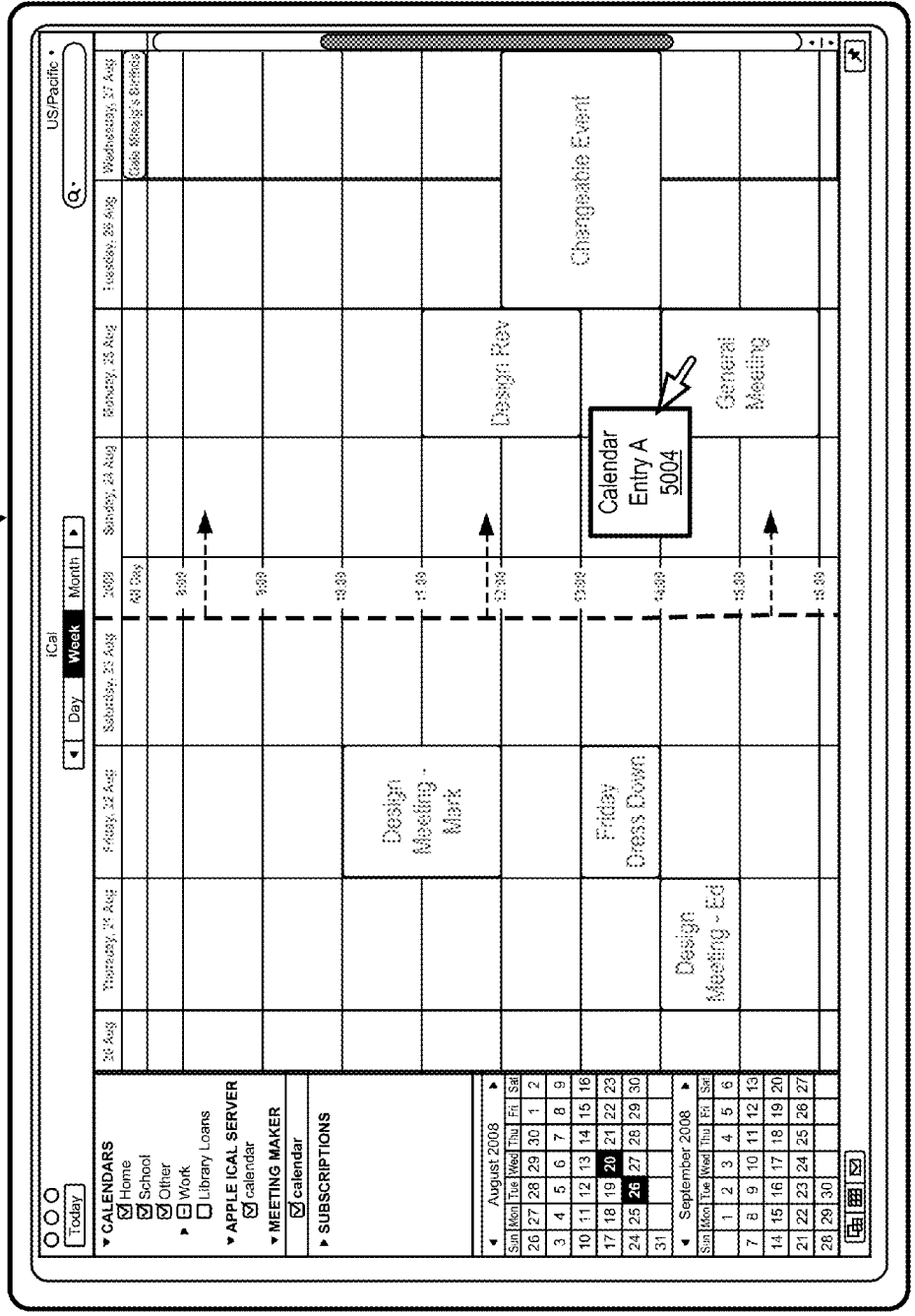
Figure 5H:
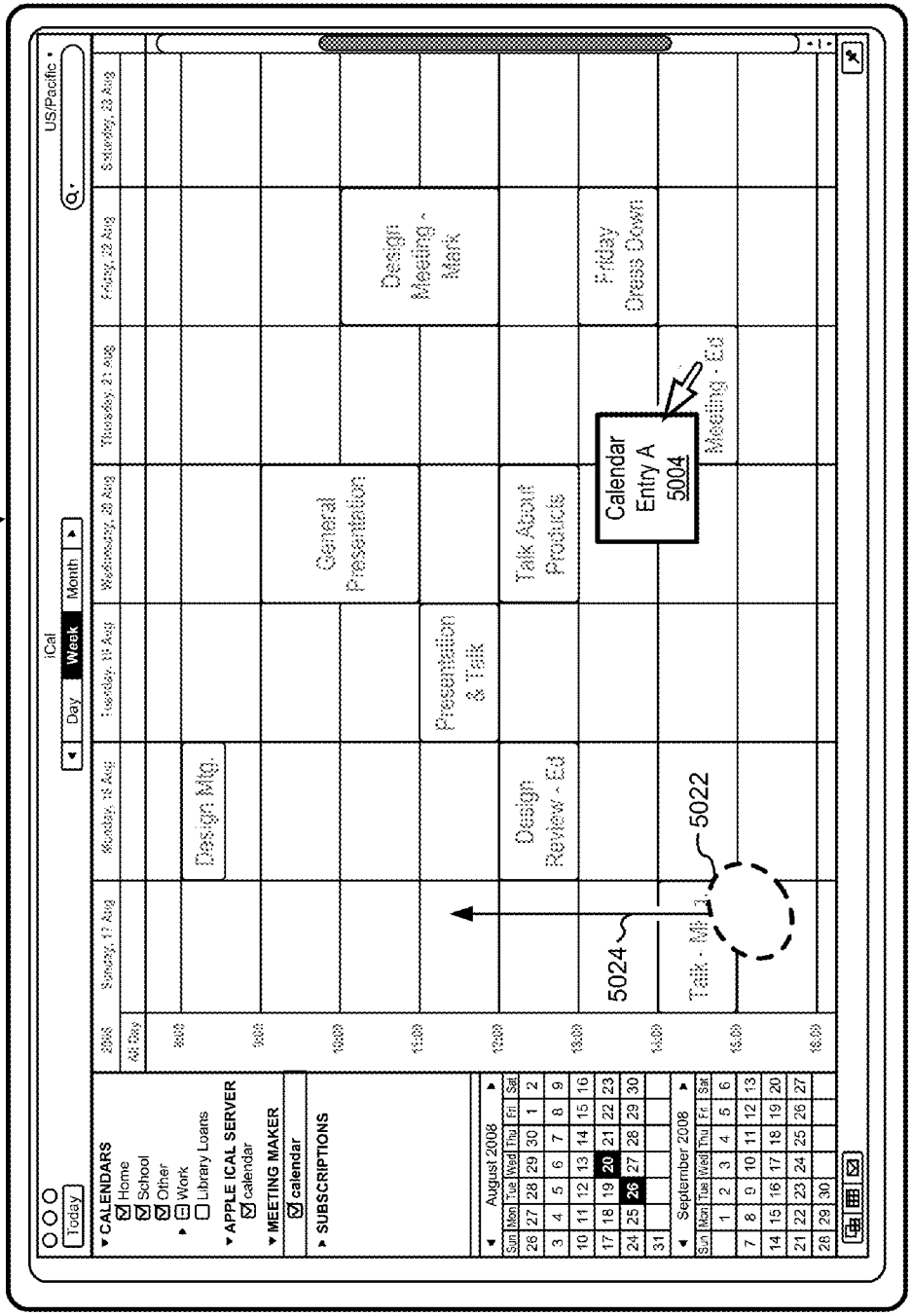
Figure 5I:
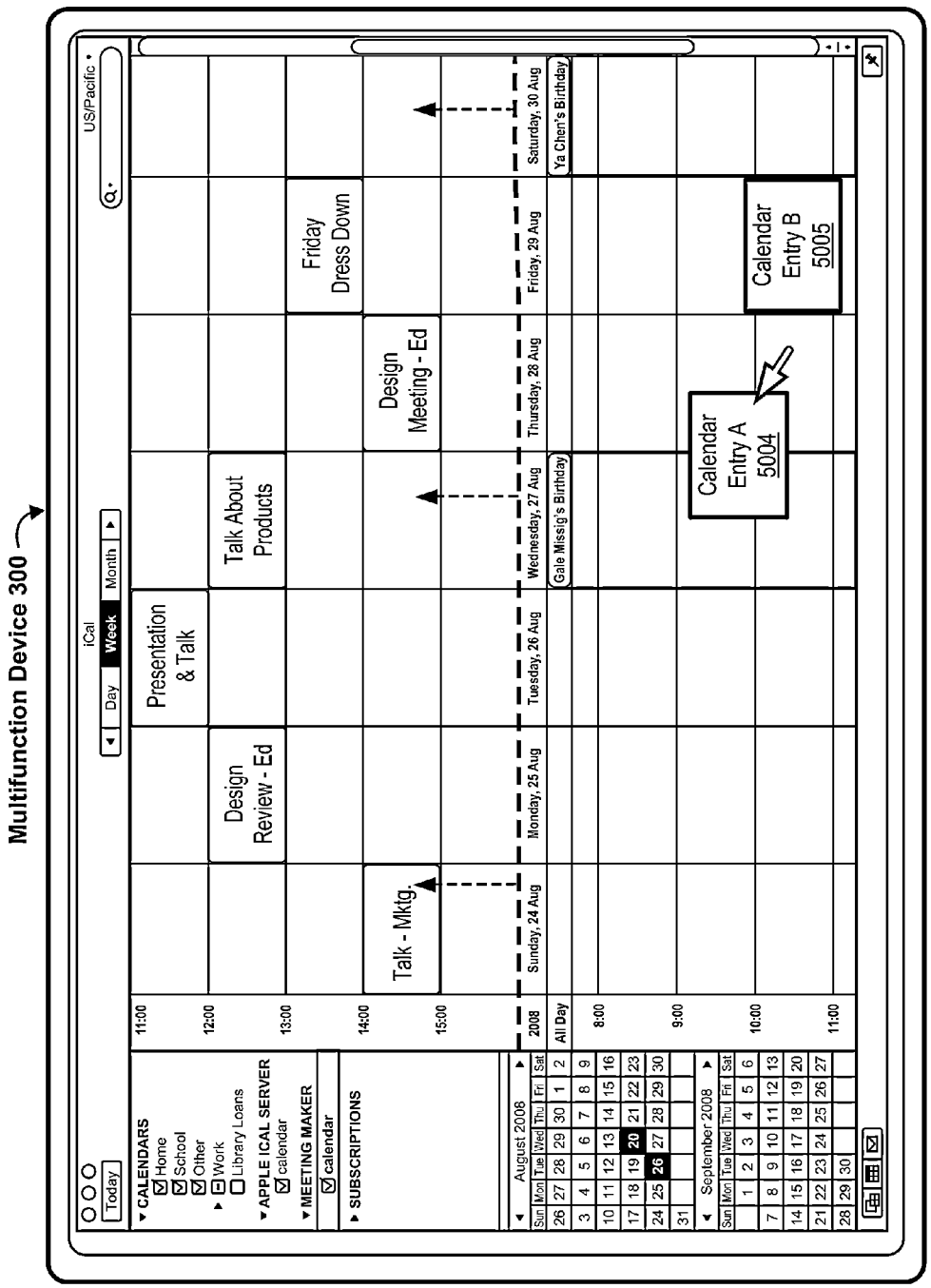
Figure 5J:
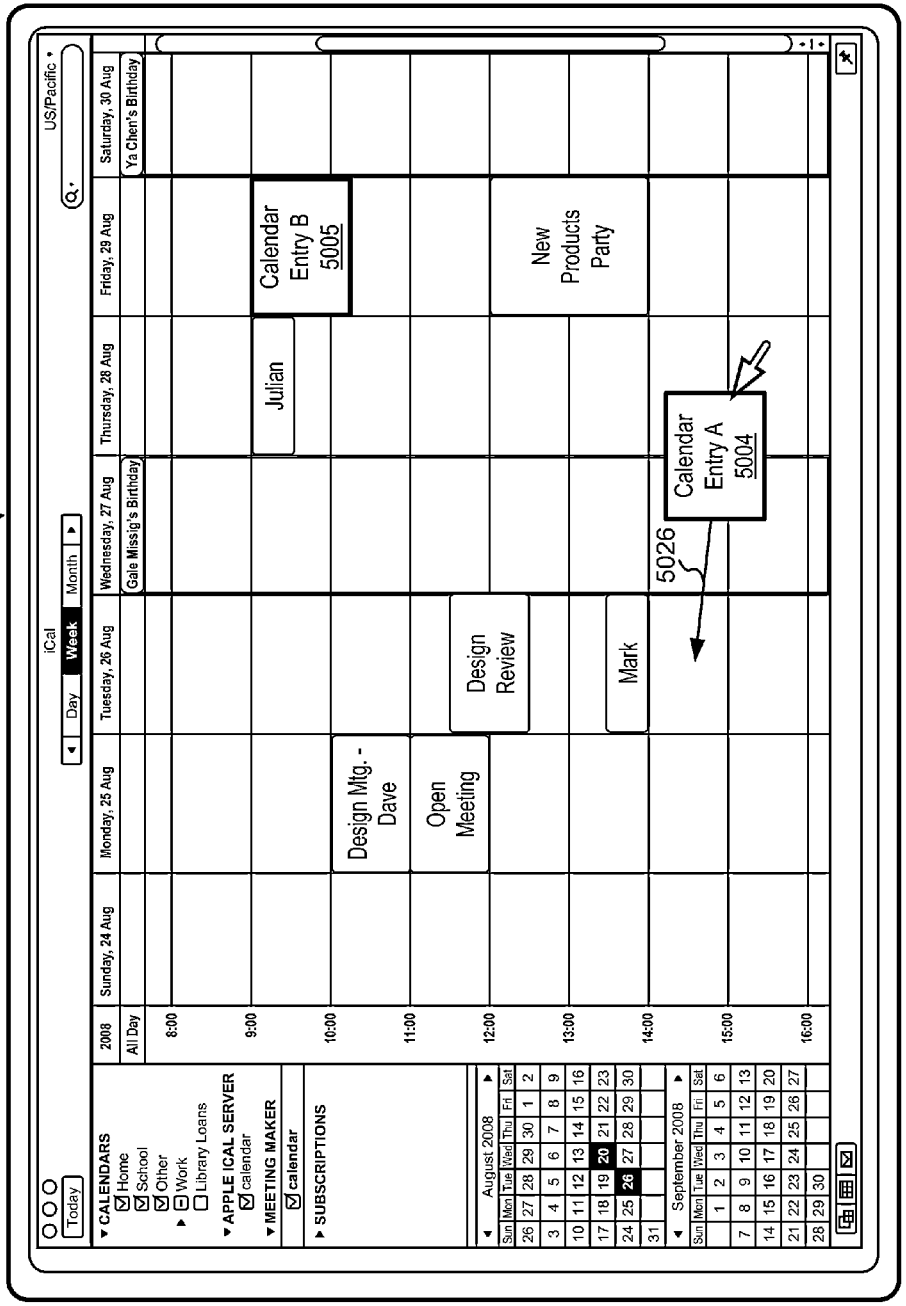
Figure 5K:
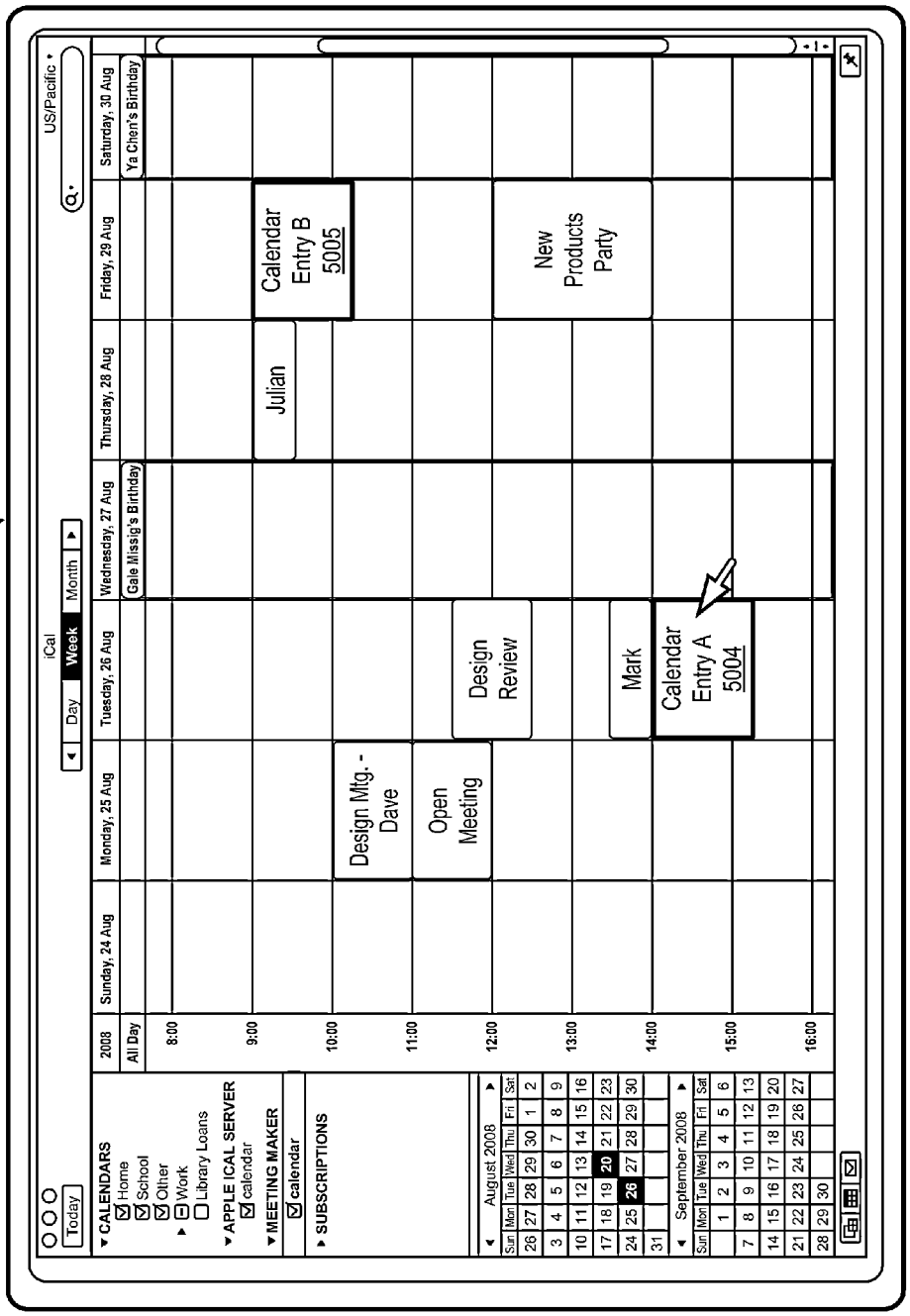
Figure 5L:
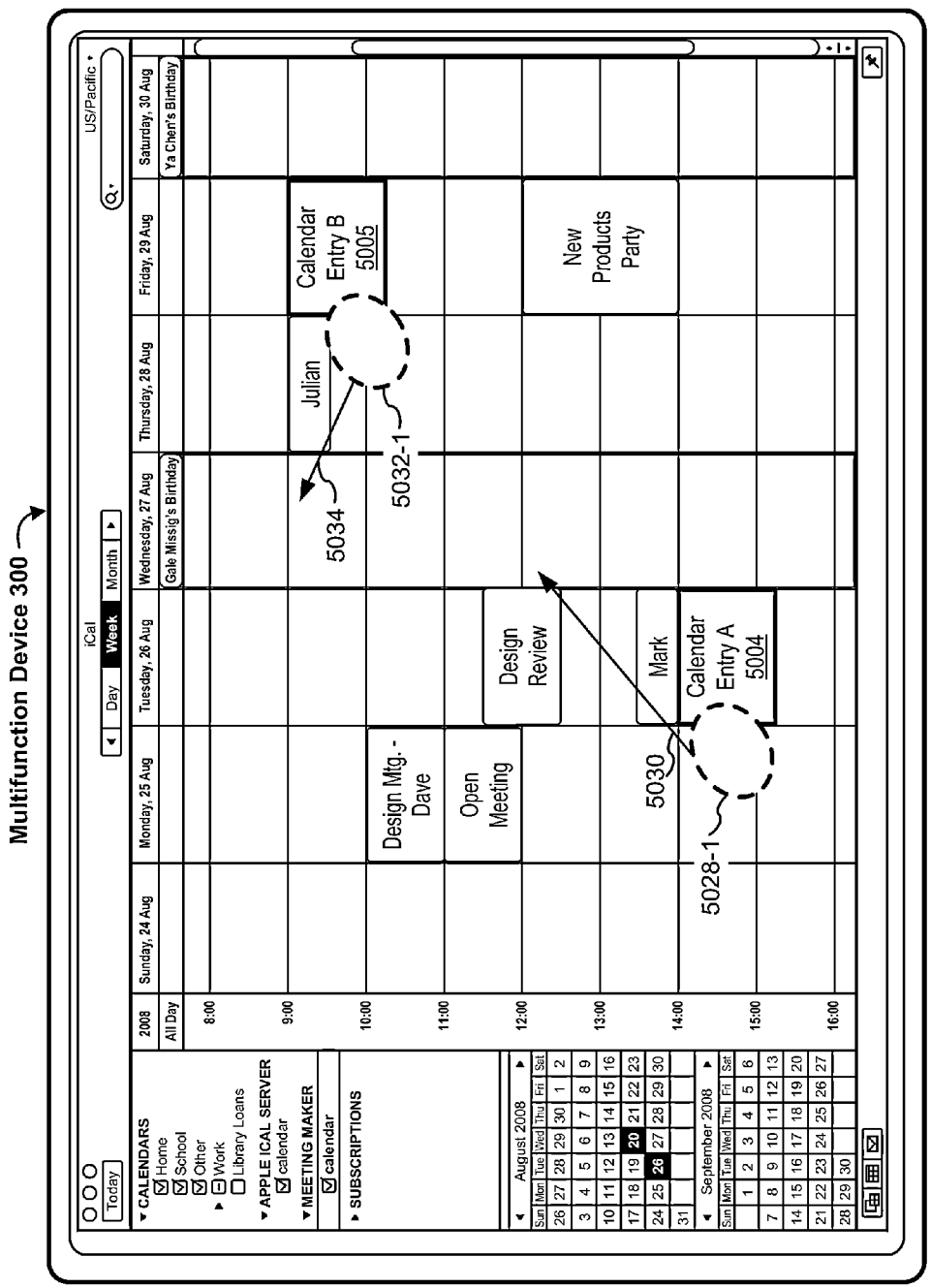
Figure 5M:
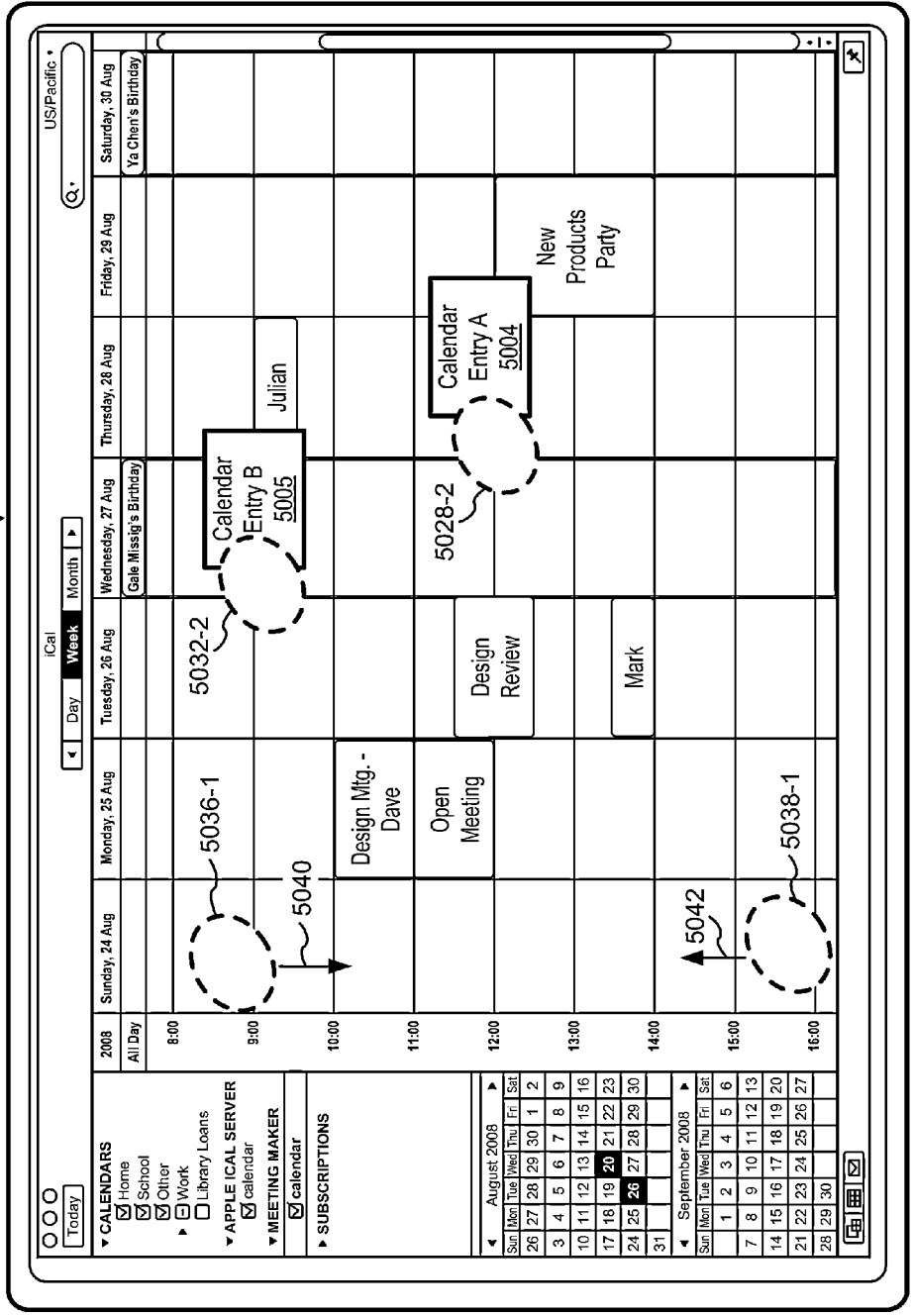
Figure 5N:
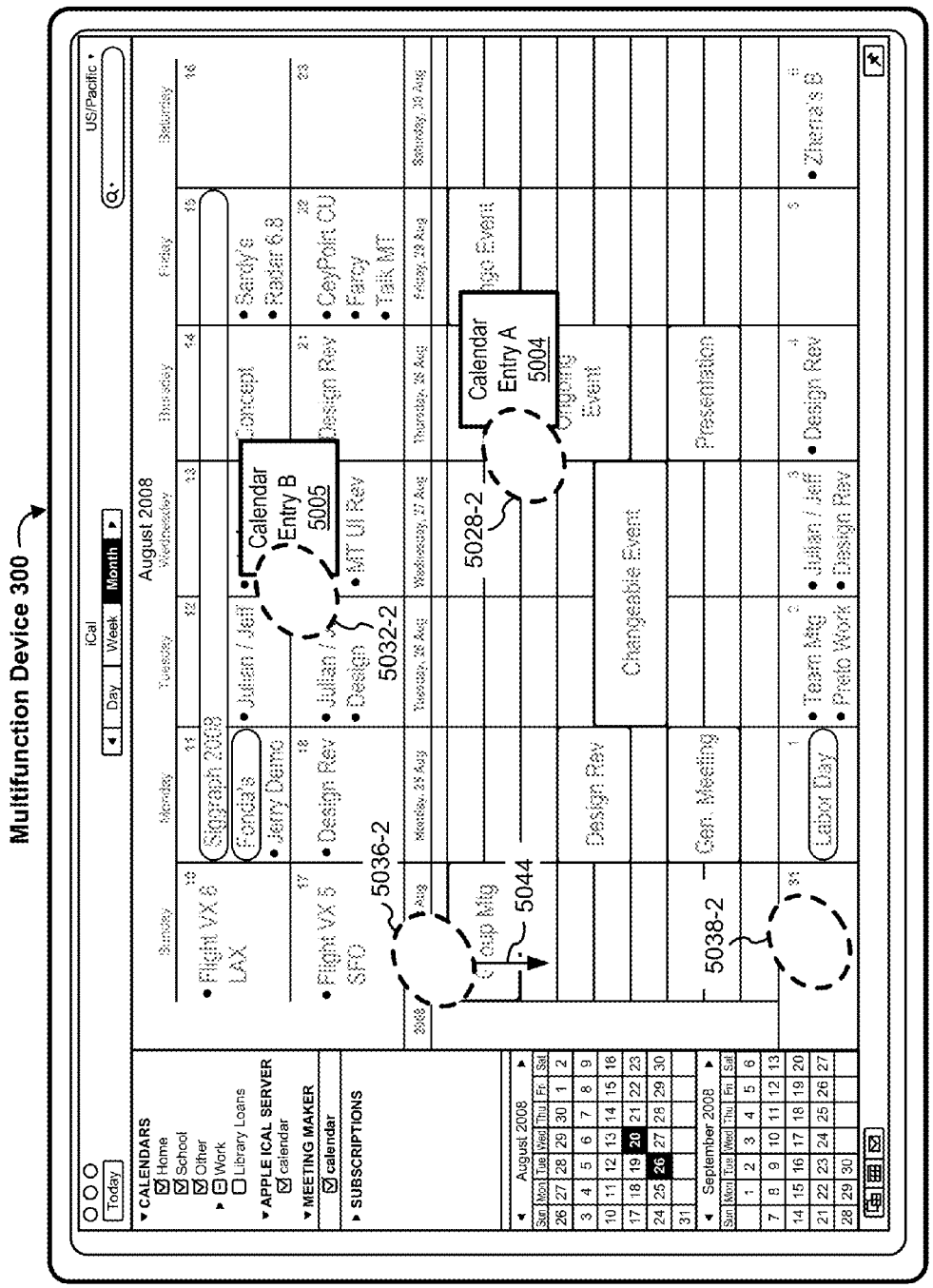
Figure 5O:
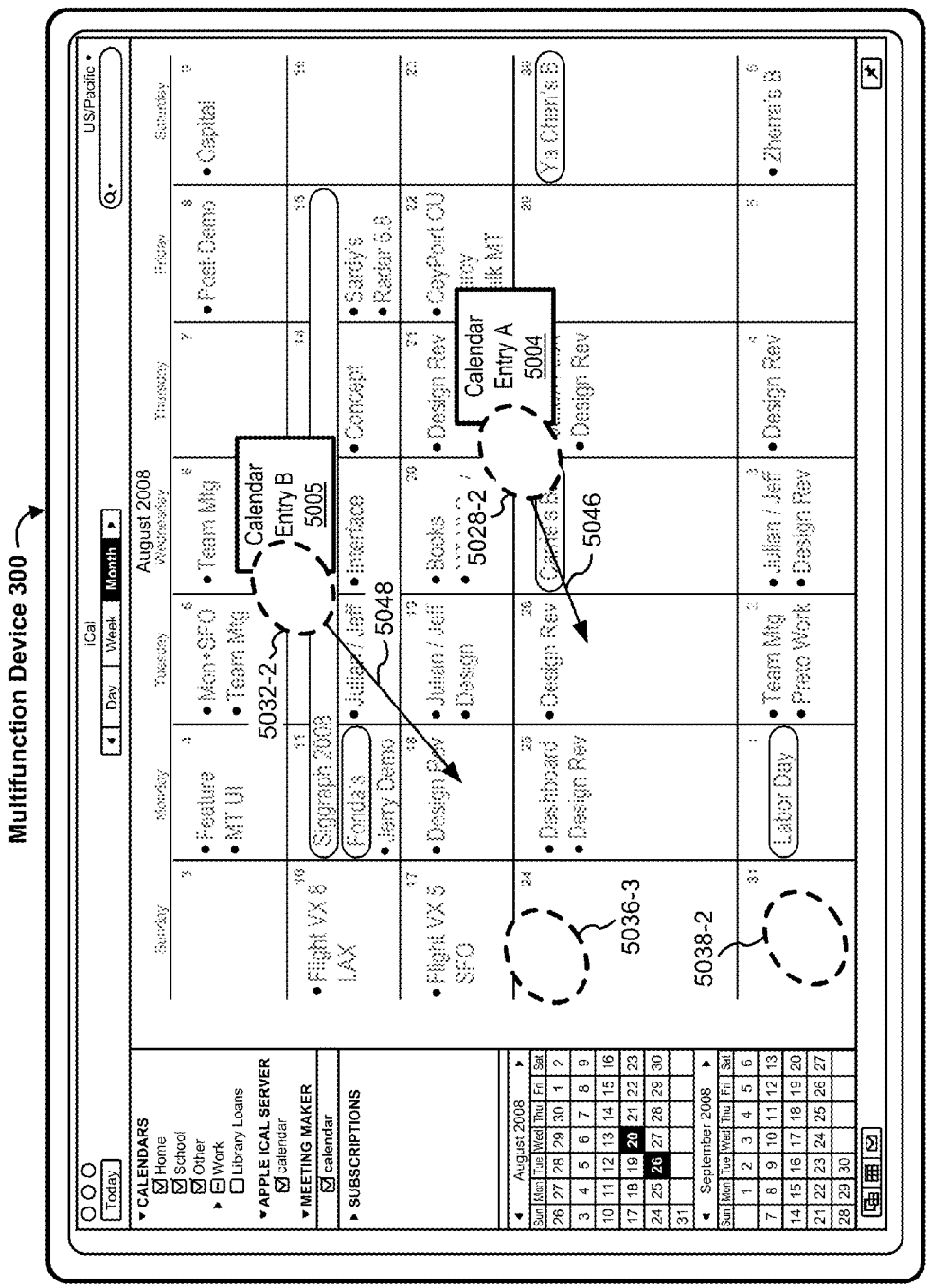
Figure 5P:
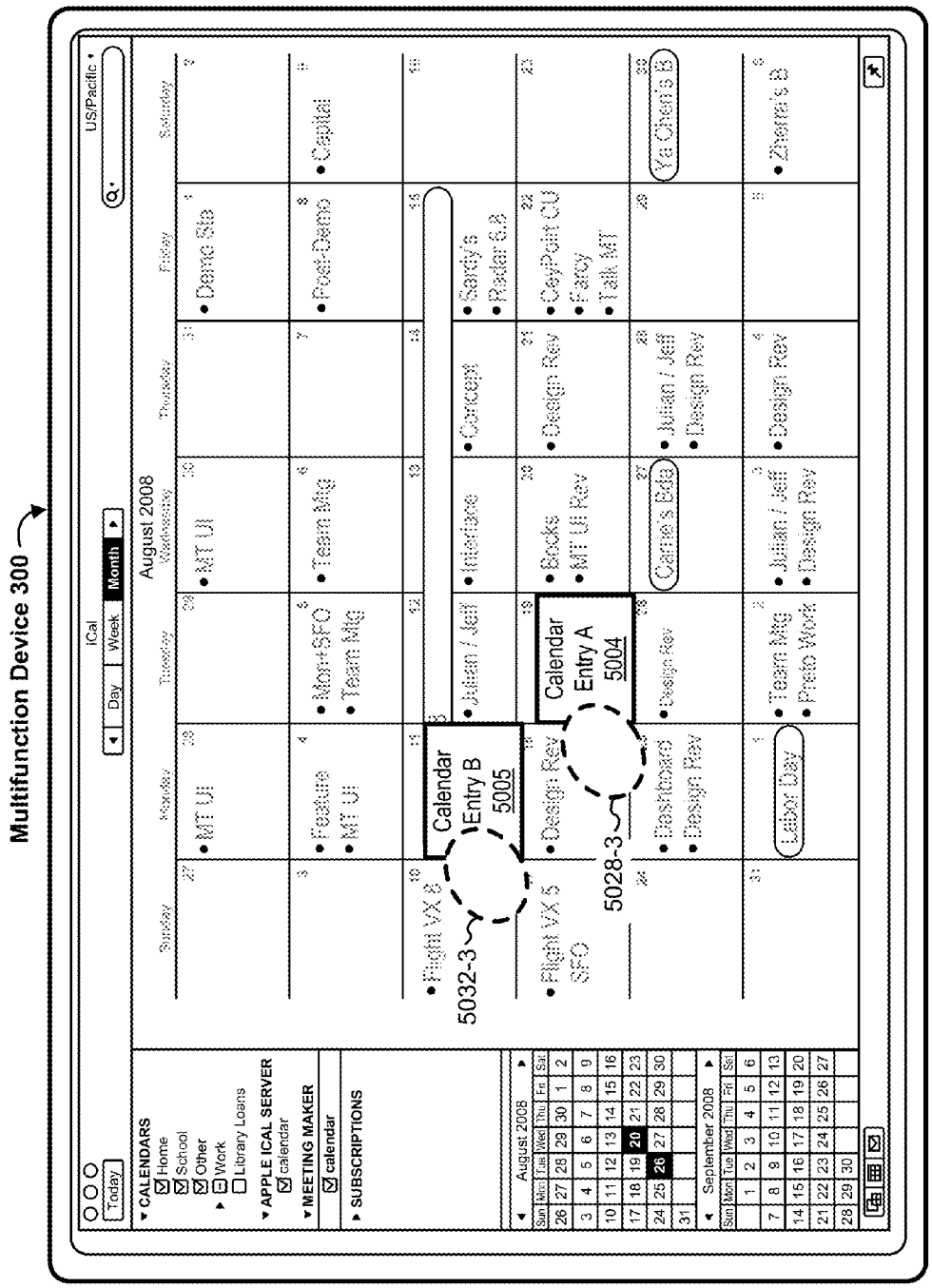
Figure 5Q:
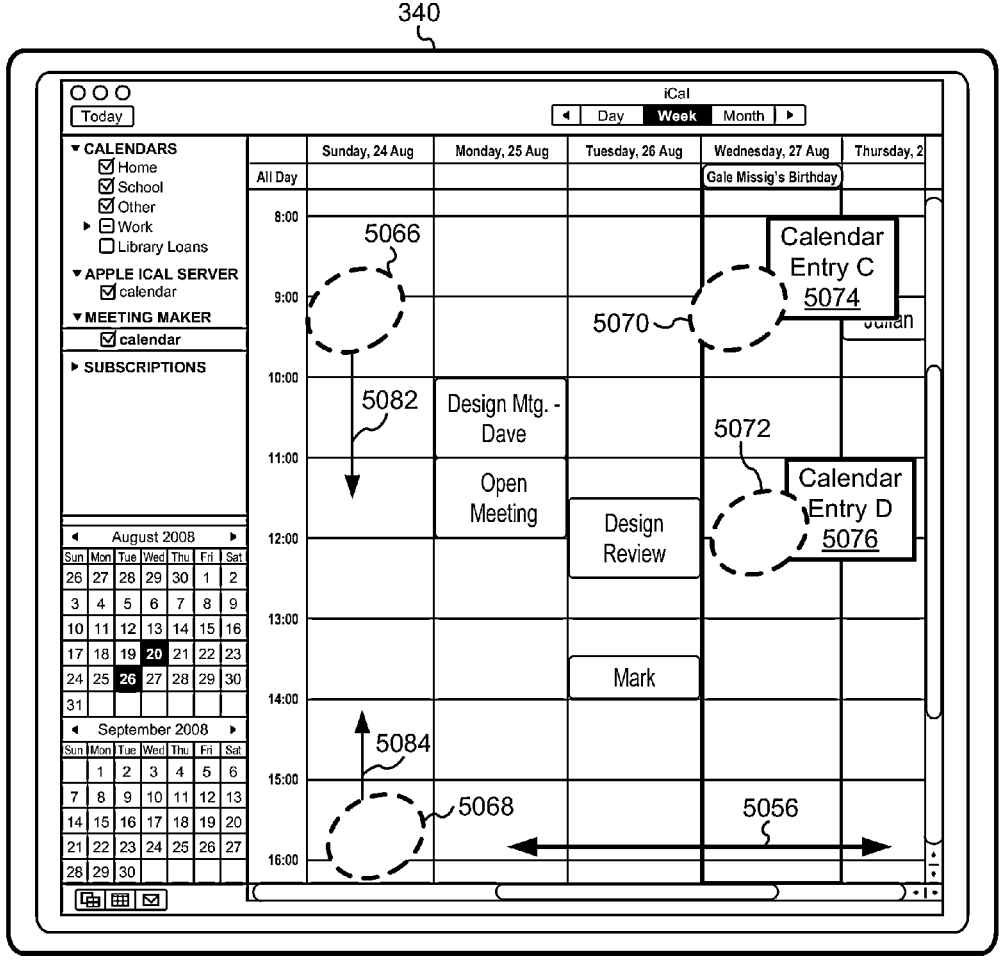
Figure 5Q:
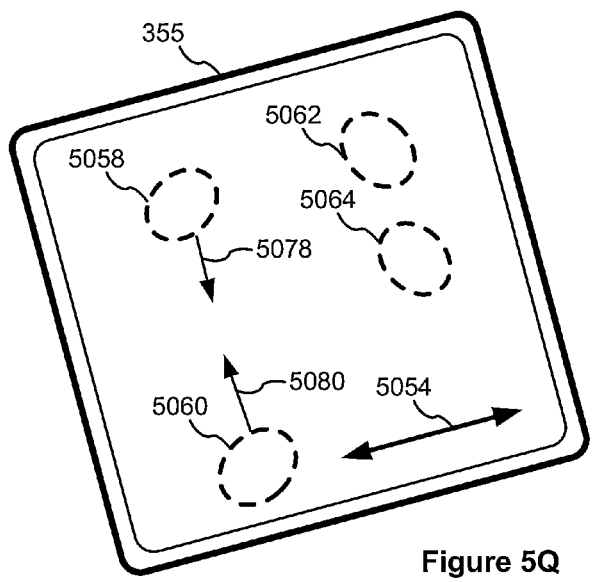
Figure 6A:
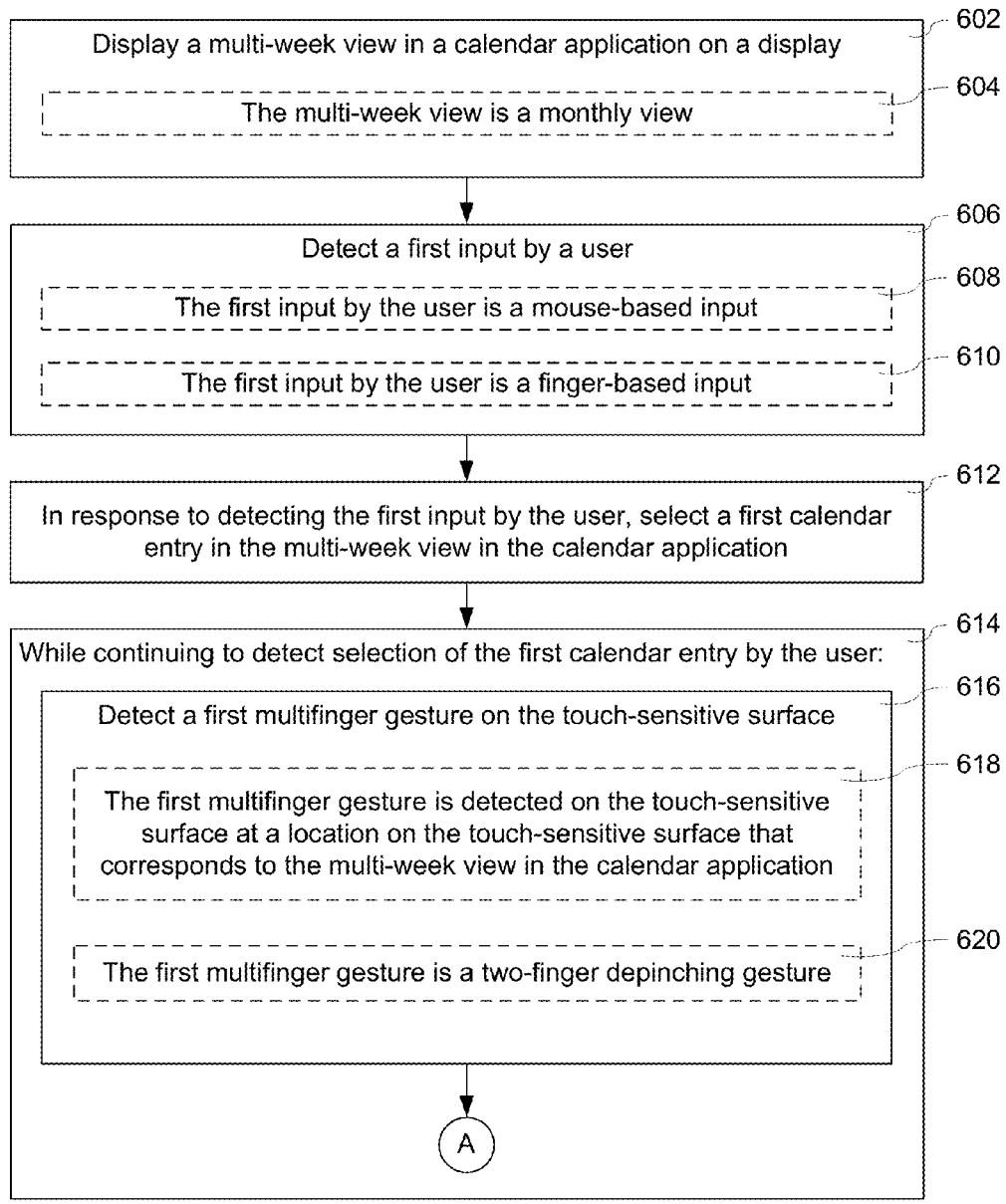
FIGS. 6A-6D are flow diagrams illustrating a method of repositioning calendar entries in a calendar application in accordance with some embodiments.
Figure 6B:
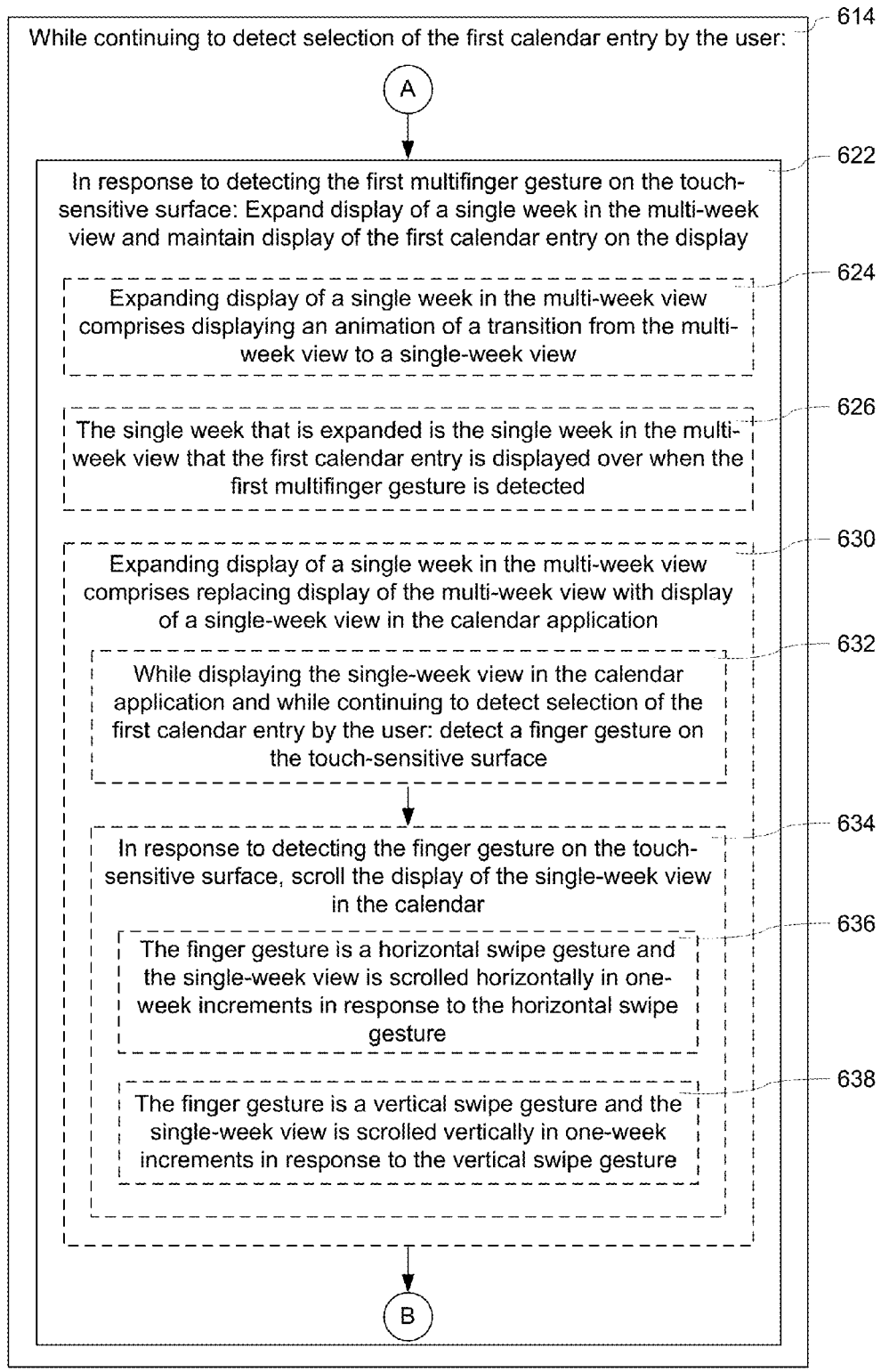
Figure 6C:
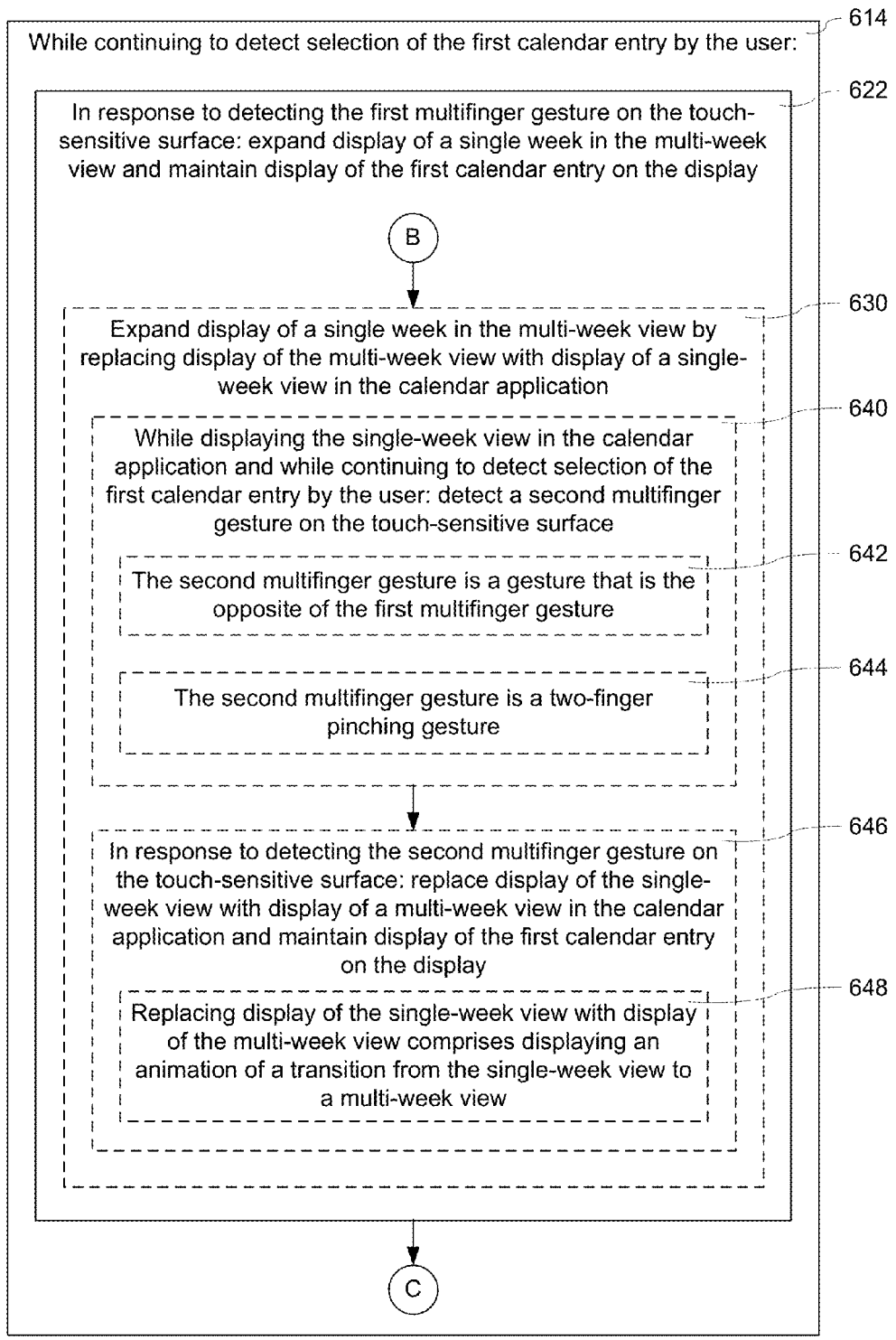
Figure 6D:
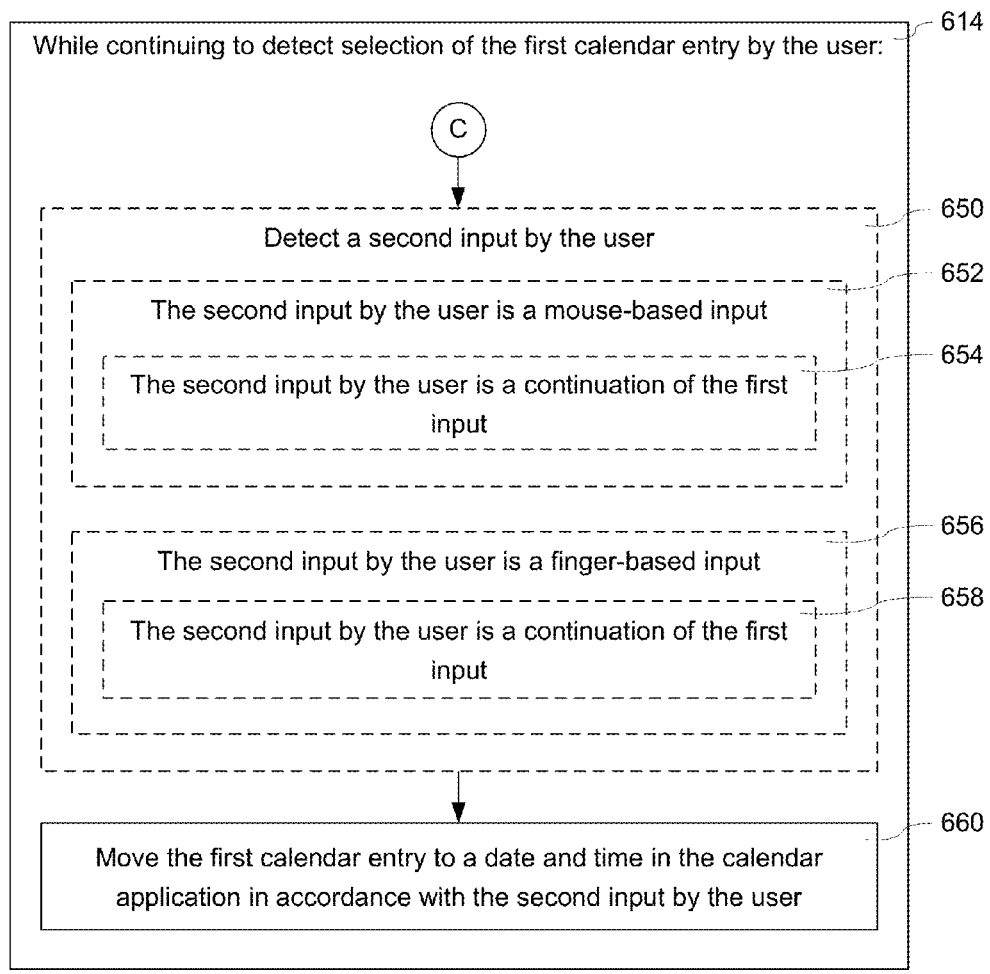

FIGS. 5A-5Q illustrate exemplary user interfaces for repositioning calendar entries in a calendar application in accordance with some embodiments. The user interfaces in these figures are used to illustrate the processes described below with respect to FIGS. 6A-6D and 7A-7B.

FIGS. 5A-5B illustrate the device responding to detection of a first user input (e.g., via cursor 5002) by selecting a calendar entry (e.g., 5004) and moving 5006 the calendar entry.

FIGS. 5B-5F illustrate the device responding to detection of a multifinger gesture by expanding display of a single week in the multi-week view.

FIGS. 5F-5H illustrate the device horizontally scrolling the display of the single-week view in the calendar in response to a finger gesture.

FIGS. 5H-5J illustrate the device vertically scrolling the display of the single-week view in the calendar in response to a finger gesture.

FIGS. 5J-5K illustrate the device moving the first calendar entry 5004 to a new date/time in the calendar application in accordance with a second input (e.g., movement 5026 and a subsequent mouse up) by the user.

FIGS. 5L-5P illustrate the device responding to a first user input that includes finger contacts with a plurality of calendar entries by selecting the calendar entries (e.g., 5004 and 5005), moving the calendar entries in accordance with the movement of the contacts, and, while continuing to detect selection of the calendar entries by the user, detecting a multifinger gesture on the touch-sensitive surface and replacing display of the single-week view with display of a multi-week view in the calendar application.

FIG. 5Q illustrates the device detecting a first user input and a multifinger gesture on a touch-sensitive surface that corresponds to, but is separate from, a display that includes one or more calendar entries and a calendar application.

FIGS. 6A-6D are flow diagrams illustrating a method 600 of repositioning calendar entries within a calendar application in accordance with some embodiments. The method is performed at a multifunction device (e.g., 100 or 300) with a display and a touch-sensitive surface. In some embodiments, the display is a touch screen display (e.g., 340 in FIG. 5A) and the touch-sensitive surface is on the display. In some embodiments, the display is separate from the touch-sensitive surface, as described in greater detail below with reference to FIG. 5Q.

As described below, the method 600 provides an intuitive way to manipulate one or more calendar entries in a calendar application using a touch-sensitive surface. A simple multifinger gesture is used to transition between a multi-week view (e.g., a monthly view) and a single week in the multi-week view while manipulating the calendar entries. The method reduces the cognitive burden on a user when repositioning one or more calendar entries in the calendar application, thereby creating a more efficient human-machine interface. For battery-operated computing devices, enabling a user to manipulate a calendar entry in a calendar application faster and more efficiently conserves power and increases the time between battery charges.

The device displays (602) a multi-week view in a calendar application on the display. In some embodiments, the multi-week view is (604) a monthly view. For example, in FIG. 5A, the month of August 2008 is displayed, including four full weeks and two partial weeks.

The device detects (606) a first input by a user. In some embodiments, the first input by the user is (608) a mouse-based input (e.g., a mouse click while the cursor 5002 in FIG. 5A is on the calendar entry A 5004 in FIG. 5A). In some embodiments, the first input by the user is (610) a finger-based input (e.g., a finger contact on the touch sensitive surface at a location on the touch sensitive surface that corresponds to the first calendar entry, as described in greater detail below with reference to FIGS. 5L-5P).

In response to detecting the first input by the user, the device selects (612) a first calendar entry (e.g., 5004 in FIG. 5A) in the multi-week view in the calendar application.

Operations 616-660 are performed while continuing (614) to detect selection of the first calendar entry (e.g., 5004 in FIG. 5A) by the user. In other words, the manipulations in the calendar application described below are performed while the calendar entry is selected by the user. For example, as described in greater detail below, after selecting a calendar entry, the device shifts the context in the calendar application in response to detecting a multifinger gesture (e.g., the device shifts from a multi-week view of the calendar application to a single-week view of the calendar application and/or shifts from a first week view to a second week view) while the calendar entry remains selected.

In some embodiments, the first input by the user includes a selection of the calendar entry (e.g., 5004 in FIG. 5A) and a movement of the cursor or finger contact (e.g., 5006 in FIG. 5A). In response to the movement of the cursor or finger contact, the device moves the selected calendar entry (e.g., calendar entry A 5004 in FIG. 5A) in accordance with the movement of the cursor or finger. For example, in FIG. 5B calendar entry A 5004 has been moved from its initial location (5004 in FIG. 5A) to a new location (5004 in FIG. 5B) in the lower right hand corner of the display. In some embodiments one or more additional distinct calendar entries (e.g., calendar entry B 5005 in FIG. 5A) are also displayed in the multi-week view.

The device detects (616) a first multifinger gesture on the touch-sensitive surface (e.g., detection of contacts 5008 and 5010 and their movement in FIGS. 5B-5D). In some embodiments, the first multifinger gesture is detected (618) by the device on the touch-sensitive surface at a location on the touch-sensitive surface that corresponds to the multi-week view in the calendar application. In some embodiments, the first multifinger gesture is (620) a two-finger depinching gesture. For example, the device detects contacts 5008-1 and 5010-1 and subsequent movement of the contacts apart from each other (e.g., movement 5012 of a first contact 5008 from a first location 5008-1 in FIG. 5B to second location 5008-2 in FIG. 5C and movement 5014 of second contact 5010 from a first location 5010-1 in FIG. 5B to a second location 5010-2 in FIG. 5C). In some embodiments the depinching gesture includes the movement of one of the contacts but not the other contact, but is still determined by the device to be a depinching gesture because the contacts move farther apart from each other. Continuing the example described above, in FIGS. 5C and 5D, contact 5008 moves 5016 from the second location 5008-2 in FIG. 5C to a third location 5008-3 in FIG. 5D, while contact 5010 remains in the second location 5010-2.

In response to detecting the first multifinger gesture on the touch-sensitive surface, the device expands (622) display of a single week in the multi-week view and maintains display of the first calendar entry on the display. In some embodiments, expanding display of the single week in the multi-week view comprises displaying (624) an animation of a transition from the multi-week view to a single-week view. In some embodiments the animation includes stretching the visual representation of the week in a direction in accordance with the depinching gesture. For example, in FIG. 5C, the row that is a visual representation of the week of August 24 is stretched so that it is taller than the visual representations of other weeks (e.g., the visual representation of the week behaves as if it were printed on a thin rubber sheet, which is being stretched in a vertical direction by the depinching gesture). Thus, in this example, calendar entry B (e.g., 5005 in FIGS. 5B-5C) moves from a first location (e.g., 5005 in FIG. 5B) to a second location (5005 in FIG. 5C) as the visual representation of the week is stretched by the device.

In some embodiments, the animation additionally includes replacing the display of a stretched visual representation of a week with a visual representation of detailed calendar entries for the week. For example, in FIG. 5D, the stretched visual representation of the week of August 24th (as shown in FIG. 5C) is replaced with a visual representation of detailed calendar entries. Thus, in this example, a compact visual representation of calendar entry B (e.g., 5005 in FIG. 5C) is replaced with a detailed visual representation of calendar entry B (e.g., 5005 in FIG. 5D), where the detailed visual representation of calendar entry B includes more information about the calendar entry than the compact visual representation (e.g., a representation of approximate start and end times, a location and/or a list of participants in the event indicated by the calendar entry). In some embodiments, the single week that is expanded is the single week (e.g., the week of August 24th in FIG. 5B) in the multi-week view that the first calendar entry (e.g., calendar entry A 5004 in FIG. 5B) is displayed (626) over when the first multifinger gesture is detected. It should be understood that in some embodiments instead of being displayed over the single week, the first calendar entry is displayed on, or within the single week. Additionally, in some embodiments, the single week that is expanded is a single week in the multi-week view that is proximate to the multifinger gesture (e.g., a week that contains one or both of the initial contacts for a depinching gesture).

In some embodiments, the device expands display of the single week in the multi-week view by replacing (630) display of the multi-week view with display of a single-week view in the calendar application. For example, in FIG. 5D the device detects a lift off of the contacts (e.g., 5008-3 and 5010-2) which performed the multifinger gesture (e.g., the depinching gesture) and in FIGS. 5E-5F, the device displays an animation replacing the multi-week view with a single-week view. In some embodiments, the animation replacing the multi-week view with a single-week view includes expanding the detailed calendar entries and shifting the detailed calendar entries so that the single-week view completely replaces the multi-week view (e.g., takes up substantially all of the space that was previously taken up by the multi-week view). For example, in FIGS. 5D-5F, calendar entry B 5005 shifts upwards on the display from a first location (e.g., 5005 in FIG. 5D) to a second location (e.g., 5005 in FIG. 5E) to a third location (e.g., 5005 in FIG. 5F). Similarly, it should be understood that in some embodiments the selected calendar entry (e.g., calendar entry A 5004) does not move as part of the animation. Rather, in some embodiments, the selected calendar entry only moves when the cursor or finger contact that is associated with the selected calendar entry moves. For example, in FIGS. 5D-5F, the cursor does not move and thus calendar entry A 5004 does not move from its location, even though the multi-week view is being stretched by the device to display a single-week view. However, it should be understood that, in this example, if the cursor or contact were to move, the selected calendar entry (e.g., calendar entry A 5004) would move independently of the animation of replacing the multi-week view with a single week-view.

In some embodiments, while displaying the single-week view in the calendar application and while continuing to detect selection of the first calendar entry by the user, the device detects (632) a finger gesture on the touch-sensitive surface. In response to detecting the finger gesture on the touch-sensitive surface, the device scrolls (634) the display of the single-week view in the calendar. In some embodiments, the finger gesture is (636) a horizontal swipe gesture and the single-week view is scrolled horizontally in one-week increments in response to the horizontal swipe gesture. For example, in FIGS. 5F-5H, the device detects a contact 5018 with the touch screen followed by a horizontal swipe gesture (e.g., movement 5020 of the contact towards the right side of the touch screen). In response to the single horizontal swipe, the device scrolls the single-week view in a one week increment (e.g., the week of August 24th is replaced with the week of August 17th). FIG. 5G illustrates an animation of the scrolling of a one week increment, where the currently displayed week (e.g., the week displayed in FIG. 5F) is replaced with a new week (e.g., the week in FIG. 5H) by simultaneously scrolling the current week off of the right side of the touch screen while scrolling the new week on from the left side of the touch screen (e.g., the animation is as if the first week and the second week are printed on one continuous piece of paper which is being pulled off the right side of the touch screen). Similarly, as described in greater detail above, it should be understood that in some embodiments the selected calendar entry (e.g., calendar entry A 5004) does not move as part of the animation. By not moving the selected calendar entry (e.g., calendar entry A 5004 in FIG. 5G) as part of the animation, the device allows the user to move the calendar entry to a new date/time simply by holding the calendar entry in a fixed location while simultaneously shifting the context of the single-week view.

In some embodiments, the finger gesture is (638) a vertical swipe gesture and the single-week view is scrolled vertically in one-week increments in response to the vertical swipe gesture. For example, in FIGS. 5H-5J, the device detects a contact 5022 with the touch screen followed by a vertical swipe gesture (e.g., movement 5024 of the contact towards the top of the touch screen), and in response to the single vertical swipe, the device scrolls the single-week view in a one week increment (e.g., the week of August 17th is replaced with the week of August 24th). FIG. 5I illustrates an animation of the scrolling of a one week increment, where the currently displayed week (e.g., the week displayed in FIG. 5H) is replaced with a new week (e.g., the week in FIG. 5J) by simultaneously scrolling the current week off of the top of the touch screen while scrolling the new week on from the bottom of the touch screen (e.g., the animation is as if the first week and the second week are printed on one continuous piece of paper which is being pulled off the top of the touch screen). In this example, calendar entry B 5005 is scrolled back onto the screen. During the animation, calendar entry B 5005 is at current location (e.g., 5005 in FIG. 5I) and at the end of the animation, calendar entry B returns to its previous location (e.g., 5005 in FIG. 5J is the same location as 5005 in FIG. 5F). Similarly, as described in greater detail above, it should be understood that in some embodiments the selected calendar entry (e.g., calendar entry A 5004 in FIGS. 5F-5J) does not move as part of the animation. By not moving the selected calendar entry (e.g., 5004 in FIG. 5I) as part of the animation, the device allows the user to move the calendar entry to a new date/time by holding the calendar entry in a fixed location while simultaneously shifting the context of the single-week view.

In some embodiments, while displaying the single-week view in the calendar application and while continuing to detect selection of the first calendar entry by the user, the device detects (640) a second multifinger gesture on the touch-sensitive surface. In some embodiments, the second multifinger gesture is (642) a gesture that is the opposite (or substantially the opposite) of the first multifinger gesture.

In some embodiments, the second multifinger gesture is (644) a two-finger pinching gesture. For example, the device detects contacts 5036-1 and 5038-1 and subsequent movement of the contacts towards each other (e.g., movement 5040 of a first contact 5036 from a first location 5036-1 in FIG. 5M to second location 5036-2 in FIG. 5N and movement 5042 of second contact 5038 from a first location 5038-1 in FIG. 5M to a second location 5038-2 in FIG. 5N). In some embodiments the pinching gesture includes the movement of one of the contacts but not the other contact, but is still a pinching gesture because the contacts move closer together. Continuing the example described above, in FIGS. 5N and 5O, contact 5036 moves 5044 from the second location 5036-2 in FIG. 5N to a third location 5036-3 in FIG. 5O, while contact 5038 remains at the second location 5038-2.

In some embodiments, in response to detecting the second multifinger gesture on the touch-sensitive surface, the device replaces (646) display of the single-week view with display of a multi-week view in the calendar application, and maintains display of the first calendar entry (e.g., 5004 in FIG. 5O) on the display. In some embodiments, replacing display of the single-week view with display of the multi-week view comprises displaying (648) an animation of a transition from the single-week view to a multi-week view. In some embodiments the animation is the reverse of the animation of a transition from the multi-week view to the single-week view. For example, the visual representation of the single week in the single-week view is visually compressed as shown in FIG. 5N. In this example, the visually compressed representation of the single week is replaced with a less detailed (e.g., compact) view of the calendar entries in the single-week view along with a less detailed (e.g., compact) view of the calendar entries for adjacent weeks, as shown in FIG. 5O.

In some embodiments, the device detects (650) a second input by the user. In response to detecting the second input by the user, the device moves (660) the first calendar entry to a date/time in the calendar application in accordance with a second input by the user.

In some embodiments, the second input by the user is (652) a mouse-based input (e.g., a mouse drag followed by a mouse up while the cursor is on the first calendar entry). In some embodiments, the second input by the user is (654) a continuation of the first input. For example, the first input is a mouse click while the cursor is on the first calendar entry and the second input is a mouse drag (to move/position the first calendar entry in the single week) and a mouse up (to place/release the first calendar entry in the single week), as shown in FIGS. 5J-5K. For example, in FIG. 5J, the device detects a mouse drag movement 5026 of calendar entry A 5004, and the device moves the calendar entry A from a first location (e.g., 5004 in FIG. 5J) which represents a first date/time in the single week to a second location (e.g., 5004 in FIG. 5K) which represents a second date/time in the single week. In this example, the device detects a mouse up command from the user and in response releases calendar entry A in a new location (e.g., 5004 in FIG. 5K) which represents a new date/time in the single week. It should be understood that a similar movement can also be used to move a calendar entry from a first calendar context (e.g., a single-week view or multi-week view) to a second calendar context (e.g., a single-week view or multi-week view) that is distinct from the first calendar context.

In some embodiments, the second input by the user is (656) a finger-based input (e.g., a finger movement on the touch-sensitive surface and a finger lift off). In some embodiments, the second input by the user is (658) a continuation of the first input. For example, the first input is a finger contact (e.g., 5028-1 in FIG. 5L) on the touch sensitive surface at a location on the touch sensitive surface that corresponds to the first calendar entry (e.g., calendar entry A 5004 in FIG. 5L) and the second input is a finger movement (e.g., 5030 in FIG. 5L and 5046 in FIG. 5O) on the touch-sensitive surface (to move/position the first calendar entry in the single week) and a finger lift off (to place/release the first calendar entry in the single week), as described below in greater detail with reference to FIGS. 5L-5P.

It should be understood that the second input described above may be detected either before the second multifinger gesture is detected or after the second multifinger gesture is detected. In other words, in some embodiments the calendar entry is moved to a date/time in a single-week view of the calendar application, while in other embodiments the calendar entry is moved to a date/time in a multi-week view of the calendar application. Similarly, in some embodiments the calendar entry is initially selected in a multi-week view of the calendar application, while in other embodiments the calendar entry is initially selected in a single-week view of the calendar application.

As one example of moving a calendar entry, the calendar entry is selected in a multi-week view and moved to a date/time in a single-week view of the calendar application by selecting the calendar entry in the multi-week view, switching to the single-week view using any of the methods for switching from a multi-week view to a single-week view discussed above with reference to FIGS. 5B-5F and then placing the calendar entry in the second single-week view. As another example of moving a calendar entry, the calendar entry is selected in a first single-week view and moved to a date/time in a distinct second single-week view of a calendar application by selecting the calendar entry in the first single-week view, switching to the second single-week view using any of the methods for switching between two single-week views discussed above with reference to FIGS. 5F-5K and then placing the calendar entry in the second single-week view. As another example of moving a calendar entry, the calendar entry is selected in a single-week view and moved to a date/time in a multi-week view of a calendar application by selecting the calendar entry in the single-week view, switching to the multi-week view using any of the methods for switching from a single-week view to a multi-week view discussed above with reference to FIGS. 5M-5P and then placing the calendar entry in the multi-week view. It should be understood that the preceding examples are merely illustrative of combinations of multi-finger gestures with other inputs while continuing to detect the selection of a calendar event.

In another example, multiple multi-finger gestures to move a calendar entry from a first single-week view to a second single-week view. In this example, the following steps are performed, in order: a calendar entry is selected in a single-week view of Week A (e.g., by a finger contact with the calendar entry); a pinching gesture is detected; a multi-week view is displayed, which includes simultaneously displaying a representation of Weeks A and B; a depinching gesture on a different week (Week B) is detected; a single-week view of Week B is displayed; a second user input is detected (e.g., liftoff of the finger contact with the calendar entry), and in response the calendar entry is placed in Week B (e.g., the date/time of the calendar entry is changed so that the calendar entry has a date/time within Week B).

Additionally, while the preceding examples have been given with reference to moving a single calendar entry, it should be understood that in some embodiments a plurality of calendar entries are moved simultaneously. In particular, in some embodiments, while a single first calendar entry is selected, a second calendar entry is also selected by the device in response to detecting a user input associated with the second calendar entry (e.g., a finger contact with the calendar entry or a mouse click on the calendar entry). It should be understood that when the first input includes gestures associated with a plurality of calendar entries (e.g., calendar entry A 5004 and calendar entry B 5005) the second input may include either an input associated with one of the calendar entries or an input associated with more than one of the plurality of calendar entries. One example of moving a plurality of calendar entries simultaneously is described in greater detail below with reference to FIGS. 5L-5P.

As an example of moving a plurality of calendar entries simultaneously, in FIG. 5L the device detects a contact 5028-1 with calendar entry A 5004 and a distinct contact 5032-1 with calendar entry B 5005 on a touch screen that is displaying a calendar application in a single-week view. The device detects movement (e.g., 5030 and 5034 in FIG. 5L) of each of the contacts to a new location on the touch screen (e.g., 5028-2 and 5032-2 in FIG. 5M) and in response moves the associated calendar entries to new locations (e.g., 5004 and 5005 in FIG. 5M). In some embodiments, each of the contacts moves independently of the other contacts and thus the calendar entry associated with that contact moves independently of the movement of the other calendar entries. While detecting movement of the contacts, the device detects a multifinger gesture (e.g., contacts 5036-1 and 5038-1 and respective movement 5040 and 5042 of each of the contacts in a pinching gesture as described in greater detail above with reference to FIGS. 5M-5O). In response to detecting the multifinger gesture (and while continuing to detect the selection of calendar entry A 5004 and calendar entry B 5005), the device shifts from the single-week view to a multi-week view as shown in FIGS. 5M-5O. In this example, the device also detects movement (e.g., 5046 and 5048) of the contacts (e.g., 5028-2 and 5032-2) associated with calendar entry A 5004 and calendar entry B 5005 to a current location (e.g., 5028-3 and 5032-3 respectively in FIG. 5P). In response to detecting the movement of the contacts, the device moves the calendar entries (e.g., 5004 and 5005 in FIG. 5O) to new locations on the touch screen. In this example, calendar entry A moves to a new location (e.g., 5004 in FIG. 5P) associated with August 19th, while calendar entry B moves to a new location (e.g., 5005 in FIG. 5P) associated with August 11th. If the device detects a release of either of these contacts, the date/time of the calendar entry associated with the contact will be changed to match a date/time associated with the current location of the calendar entry that was associated with the released contact (e.g., calendar entry A would be associated with August 19th, while calendar entry B would be associated with August 11th).

Additionally, although the preceding examples have been given with reference to a touch screen display, in some embodiments the display and the touch-sensitive surface are separate, as shown in FIG. 5Q. For example, in FIG. 5Q, the display 340 and the touch-sensitive surface (e.g., track pad 355) are separate. In some embodiments the touch sensitive surface 355 has a primary axis (e.g., 5054 in FIG. 5Q) that corresponds to a primary axis (e.g., 5056 in FIG. 5Q) on the display 340. In accordance with these embodiments, the device detects a plurality of contacts (e.g., 5058, 5060, 5062, 5064 in FIG. 5Q) with the touch-sensitive surface at locations that correspond to respective locations on the display (e.g., in FIG. 5Q 5058 corresponds to 5066, 5060 corresponds to 5068, 5062 corresponds to 5070, and 5064 corresponds to 5072). The device detects a first user input (e.g., 5062 and/or 5064) on the touch sensitive surface, which corresponds to one or more calendar entries (e.g., calendar entry C 5074 and/or calendar entry D 5076 in FIG. 5Q) in the calendar application on the display (e.g., 340 in FIG. 5Q). While continuing to detect the first user input, the device detects a first multifinger gesture on the touch-sensitive surface at a location that corresponds to a multifinger gesture on the display. For example, a pinching gesture including movement (e.g., 5078 and 5080) of at least two of the contacts (e.g., 5058 and 5060) on the touch-sensitive surface towards each other corresponds to a pinching gesture including corresponding movement (e.g., 5082 and 5084) of corresponding contacts (e.g., 5066 and 5068) on the display towards each other. In this way, user inputs detected by the device on the touch-sensitive surface (e.g., trackpad 355 in FIG. 5Q) are used by the device to manipulate the calendar application on the display (e.g., 5050 in FIG. 5Q) of the multifunction device when the touch-sensitive surface 355 and the display 340 are separate.

Figure 7A:
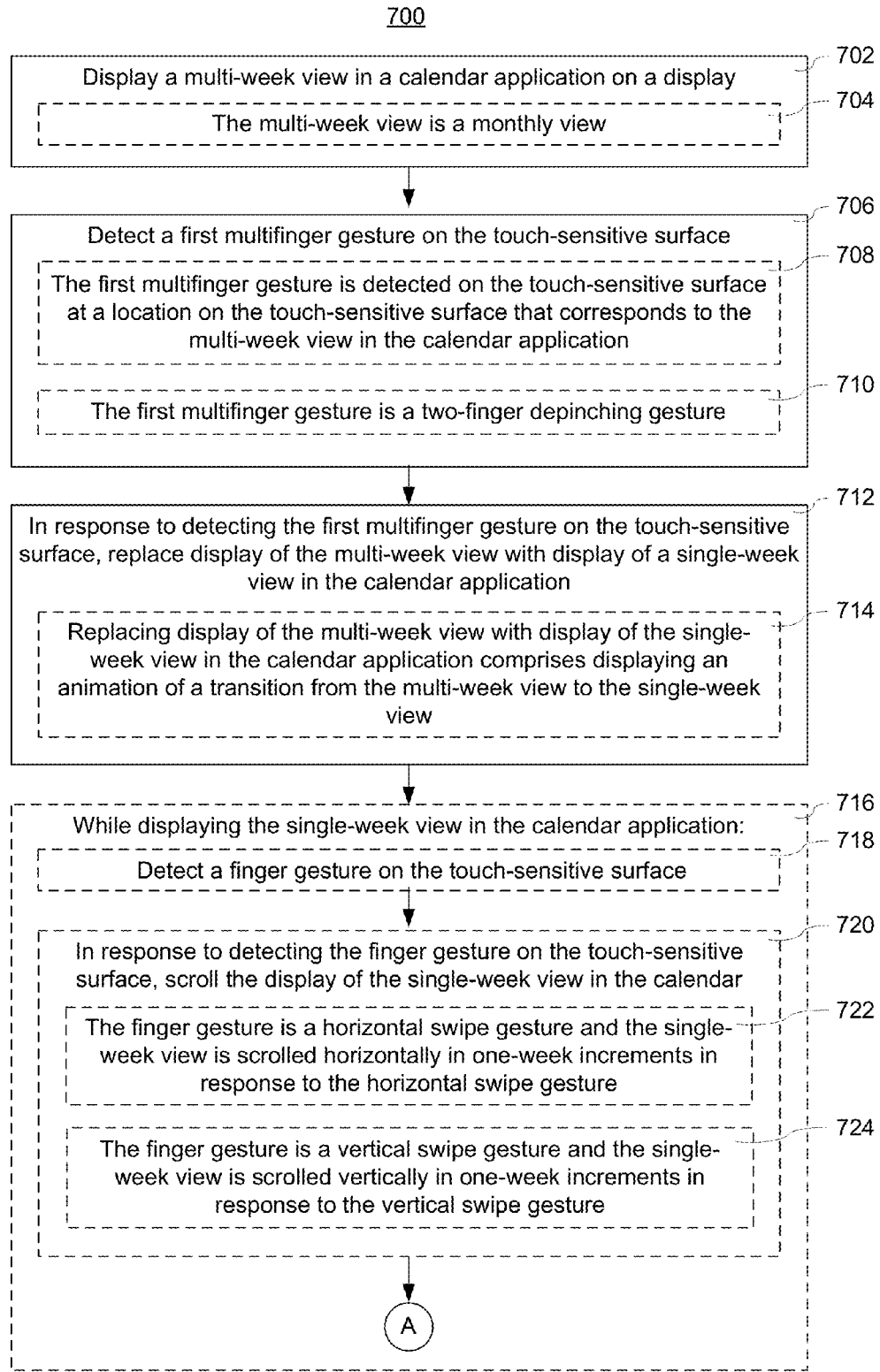
FIGS. 7A-7B are flow diagrams illustrating a method of replacing a multi-week view with a single-week view in a calendar application in accordance with some embodiments.
Figure 7B:
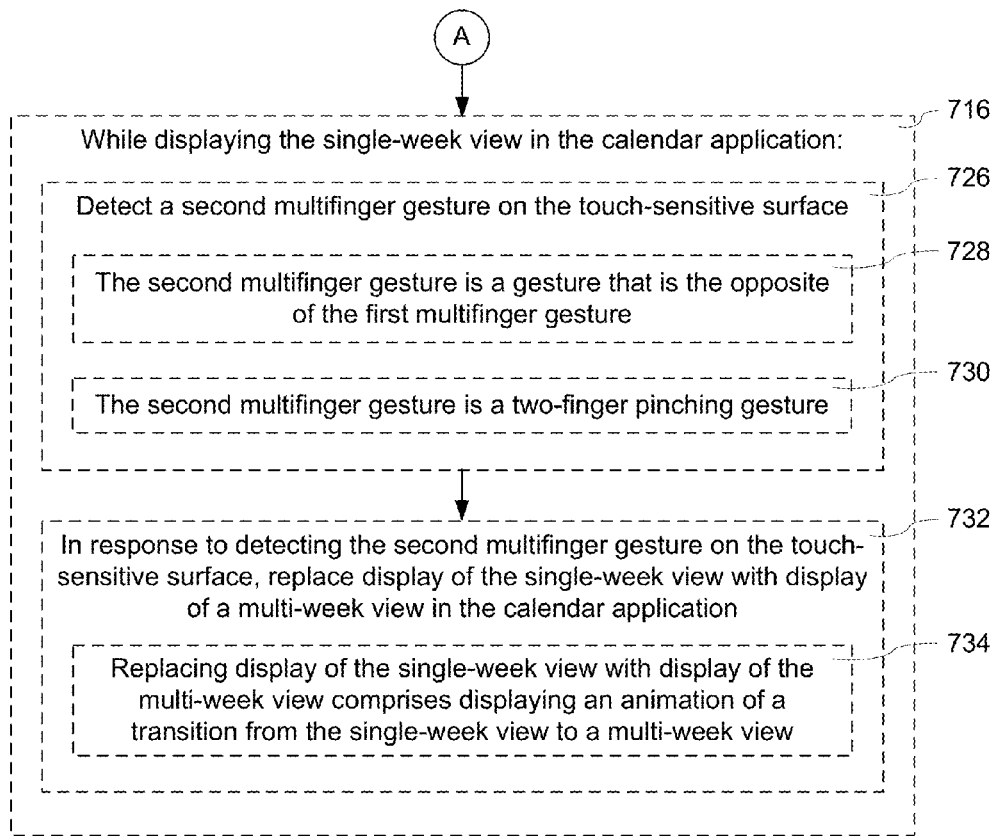

FIGS. 7A-7B are flow diagrams illustrating a method 700 of replacing a multi-week view with a single-week view in a calendar application in accordance with some embodiments. The method is performed at a multifunction device (e.g., 100 or 300) with a display and a touch-sensitive surface. In some embodiments, the display is a touch screen display (e.g., 340 in FIG. 5A) and the touch-sensitive surface is on the display. In some embodiments, the display is separate from the touch-sensitive surface, as described in greater detail above with reference to FIG. 5Q.

As described below, the method 700 provides an intuitive way to change calendar views using a touch-sensitive surface. A simple multifinger gesture is used to transition between a multi-week view (e.g., a monthly view) and a single week in the multi-week view. The method reduces the cognitive burden on a user when changing views in the calendar application, thereby creating a more efficient human-machine interface. For battery-operated computing devices, enabling a user to change views in a calendar application faster and more efficiently conserves power and increases the time between battery charges.

The device displays (702) a multi-week view in a calendar application on the display. In some embodiments, the multi-week view is (704) a monthly view (e.g., in FIG. 5A the month of August 2008 is displayed, including a plurality of weeks). The device detects (706) a first multifinger gesture on the touch-sensitive surface. In some embodiments, the first multifinger gesture is (708) detected on the touch-sensitive surface at a location on the touch-sensitive surface that corresponds to the multi-week view in the calendar application. In some embodiments, the first multifinger gesture is (710) a two-finger depinching gesture (e.g., the depinching gesture of contacts 5008 and 5010 as described in greater detail above with reference to FIGS. 5B-5D).

In response to detecting the first multifinger gesture on the touch-sensitive surface, the device replaces (712) display of the multi-week view with display of a single-week view in the calendar application. In some embodiments, replacing display of the multi-week view with display of the single-week view in the calendar application comprises displaying (714) an animation of a transition from the multi-week view to the single-week view (e.g., as described in greater detail above with reference to FIGS. 5B-5D).

In some embodiments operations 718-734 are performed while displaying (716) the single-week view in the calendar application. The device detects (718) a finger gesture on the touch-sensitive surface. In response to detecting the finger gesture on the touch-sensitive surface, the device scrolls (720) the display of the single-week view in the calendar. In some embodiments, the finger gesture is a horizontal swipe gesture (e.g., a contact 5018 and movement 5020 of the contact in a horizontal direction on the display as shown in FIG. 5F) and the single-week view is scrolled horizontally (722) in one-week increments in response to the horizontal swipe gesture (e.g., as described in greater detail above with reference to FIGS. 5F-5H). In some embodiments, the finger gesture is a vertical swipe gesture (e.g., a contact 5022 and movement 5024 of the contact in a vertical direction on the display in FIG. 5H) and the single-week view is (724) scrolled vertically in one-week increments in response to the vertical swipe gesture (e.g., as described in greater detail above with reference to FIGS. 5H-J).

In some embodiments, while displaying the single-week view in the calendar application the device detects (726) a second multifinger gesture on the touch-sensitive surface. In some embodiments, the second multifinger gesture is (728) a gesture that is the opposite (or substantially the opposite) of the first multifinger gesture. In some embodiments, the second multifinger gesture is (730) a two-finger pinching gesture (e.g., the pinching gesture of contacts 5036 and 5038 as described in greater detail above with reference to FIGS. 5M-5O).

In some embodiments, in response to detecting the second multifinger gesture on the touch-sensitive surface, the device replaces (732) display of the single-week view with display of a multi-week view in the calendar application (e.g., as shown in when the user interface in FIG. 5M is replaced with the user interface in FIG. 5P, as described in greater detail above with reference to these Figures). In some embodiments, replacing display of the single-week view with display of the multi-week view comprises displaying (734) an animation of a transition from the single-week view to a multi-week view (e.g., as described in greater detail above with reference to FIGS. 5M-5O).

Additionally, although the preceding examples have been given with reference to a touch screen display, it should be understood that in some embodiments the display and the touch-sensitive surface are separate, as described in greater detail above with reference to FIG. 5Q.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a multifunction device with a display and a touch-sensitive surface:
displaying a multi-week view in a calendar application on the display;
detecting a first input by a user;
in response to detecting the first input by the user, selecting a first calendar entry in the multi-week view in the calendar application;
while continuing to detect the first input indicating selection of the first calendar entry by the user:
detecting a first multifinger gesture on the touch-sensitive surface;
in response to detecting the first multifinger gesture on the touch-sensitive surface:
expanding display of a single week in the multi-week view; and
maintaining display of the first calendar entry on the display; and
moving the first calendar entry to a date and time in the calendar application in accordance with a second input by the user.

2. The method of claim 1, wherein the first multifinger gesture is a two-finger depinching gesture.

3. The method of claim 1, wherein expanding display of the single week in the multi-week view comprises replacing display of the multi-week view with display of a single-week view in the calendar application.

4. The method of claim 1, wherein the single week that is expanded is the single week in the multi-week view that the first calendar entry is displayed over when the first multifinger gesture is detected.

5. The method of claim 1, wherein the second input by the user is a continuation of the first input.

6. The method of claim 3, including:
while displaying the single-week view in the calendar application and while continuing to detect selection of the first calendar entry by the user:
detecting a finger gesture on the touch-sensitive surface; and,
in response to detecting the finger gesture on the touch-sensitive surface, scrolling the display of the single-week view in the calendar.

7. The method of claim 3, including:
while displaying the single-week view in the calendar application and while continuing to detect selection of the first calendar entry by the user:
detecting a second multifinger gesture on the touch-sensitive surface; and,
in response to detecting the second multifinger gesture on the touch-sensitive surface:
replacing display of the single-week view with display of a multi-week view in the calendar application, and
maintaining display of the first calendar entry on the display.

8. The method of claim 7, wherein the second multifinger gesture is a gesture that is the opposite of the first multifinger gesture.

9. The method of claim 7, wherein replacing display of the single-week view with display of the multi-week view comprises displaying an animation of a transition from the single-week view to a multi-week view.

10. A graphical user interface on a multifunction device with a display and a touch-sensitive surface, the graphical user interface comprising:
a multi-week view in a calendar application; and
a first calendar entry in the multi-week view;
wherein, in response to detecting a first input by a user;
the first calendar entry in the multi-week view in the calendar application is selected;
while continuing to detect the first input indicating selection of the first calendar entry by the user:
in response to detecting a first multifinger gesture on the touch-sensitive surface:
display of a single week in the multi-week view is expanded; and
display of the first calendar entry on the display is maintained; and
the first calendar entry is moved to a date and time in the calendar application in accordance with a second input by the user.

11. A multifunction device, comprising:
a display;
a touch-sensitive surface;
one or more processors;
memory; and
one or more programs, wherein the one or more programs are stored in the memory and configured to be executed by the one or more processors, the one or more programs including instructions for:
displaying a multi-week view in a calendar application on the display;
detecting a first input by a user;
in response to detecting the first input by the user, selecting a first calendar entry in the multi-week view in the calendar application;
while continuing to detect the first input indicating selection of the first calendar entry by the user:
detecting a first multifinger gesture on the touch-sensitive surface;
in response to detecting the first multifinger gesture on the touch-sensitive surface:
expanding display of a single week in the multi-week view; and
maintaining display of the first calendar entry on the display; and moving the first calendar entry to a date and time in the calendar application in accordance with a second input by the user.

12. A non-transitory computer readable storage medium storing one or more programs, the one or more programs comprising instructions, which when executed by a multifunction device with a display and a touch-sensitive surface, cause the device to:
    display a multi-week view in a calendar application on the display;
    detect a first input by a user;
    in response to detecting the first input by the user, selecting a first calendar entry in the multi-week view in the calendar application;
    while continuing to detect the first input indicating selection of the first calendar entry by the user:
        detect a first multifinger gesture on the touch-sensitive surface;
        in response to detecting the first multifinger gesture on the touch-sensitive surface:
            expanding display of a single week in the multi-week view; and
            maintaining display of the first calendar entry on the display; and
        move the first calendar entry to a date and time in the calendar application in accordance with a second input by the user.

13. The device of claim 11, wherein the first multifinger gesture is a two-finger depinching gesture.

14. The device of claim 11, wherein expanding display of the single week in the multi-week view comprises replacing display of the multi-week view with display of a single-week view in the calendar application.

15. The device of claim 11, wherein the single week that is expanded is the single week in the multi-week view that the first calendar entry is displayed over when the first multifinger gesture is detected.

16. The device of claim 11, wherein the second input by the user is a continuation of the first input.

17. The device of claim 14, further comprising instructions for:
    while displaying the single-week view in the calendar application and while continuing to detect selection of the first calendar entry by the user:
        detecting a finger gesture on the touch-sensitive surface; and,
        in response to detecting the finger gesture on the touch-sensitive surface, scrolling the display of the single-week view in the calendar.

18. The device of claim 14, further comprising instructions for:
    while displaying the single-week view in the calendar application and while continuing to detect selection of the first calendar entry by the user:
        detecting a second multifinger gesture on the touch-sensitive surface; and,
        in response to detecting the second multifinger gesture on the touch-sensitive surface:
            replacing display of the single-week view with display of a multi-week view in the calendar application, and
            maintaining display of the first calendar entry on the display.

19. The device of claim 18, wherein the second multifinger gesture is a gesture that is the opposite of the first multifinger gesture.

20. The device of claim 18, wherein replacing display of the single-week view with display of the multi-week view comprises displaying an animation of a transition from the single-week view to a multi-week view.

21. The non-transitory computer readable storage medium of claim 12, wherein the first multifinger gesture is a two-finger depinching gesture.

22. The non-transitory computer readable storage medium of claim 12, wherein expanding display of the single week in the multi-week view comprises replacing display of the multi-week view with display of a single-week view in the calendar application.

23. The non-transitory computer readable storage medium of claim 12, wherein the single week that is expanded is the single week in the multi-week view that the first calendar entry is displayed over when the first multifinger gesture is detected.

24. The non-transitory computer readable storage medium of claim 12, wherein the second input by the user is a continuation of the first input.

25. The non-transitory computer readable storage medium of claim 20, further comprising instructions which cause the device to:
    while displaying the single-week view in the calendar application and while continuing to detect selection of the first calendar entry by the user:
        detecting a finger gesture on the touch-sensitive surface; and,
        in response to detecting the finger gesture on the touch-sensitive surface, scrolling the display of the single-week view in the calendar.

26. The non-transitory computer readable storage medium of claim 20, further comprising instructions which cause the device to:
    while displaying the single-week view in the calendar application and while continuing to detect selection of the first calendar entry by the user:
        detecting a second multifinger gesture on the touch-sensitive surface; and,
        in response to detecting the second multifinger gesture on the touch-sensitive surface:
            replacing display of the single-week view with display of a multi-week view in the calendar application, and
            maintaining display of the first calendar entry on the display.

27. The non-transitory computer readable storage medium of claim 26, wherein the second multifinger gesture is a gesture that is the opposite of the first multifinger gesture.

28. The non-transitory computer readable storage medium of claim 26, wherein replacing display of the single-week view with display of the multi-week view comprises displaying an animation of a transition from the single-week view to a multi-week view.

* * * * *